United States Patent
Lachwani et al.

(10) Patent No.: US 9,268,670 B1
(45) Date of Patent: Feb. 23, 2016

(54) SYSTEM FOR MODULE SELECTION IN SOFTWARE APPLICATION TESTING INCLUDING GENERATING A TEST EXECUTABLE BASED ON AN AVAILABILITY OF ROOT ACCESS

(71) Applicant: Google Inc., Mountain View, CA (US)

(72) Inventors: Manish Lachwani, Sunnyvale, CA (US); Jay Srinivasan, San Francisco, CA (US); Pratyus Patnaik, San Francisco, CA (US); Timothy D. Wang, Oakland, CA (US)

(73) Assignee: Google Inc., Mountain View, CA (US)

( * ) Notice: Subject to any disclaimer, the term of this patent is extended or adjusted under 35 U.S.C. 154(b) by 272 days.

(21) Appl. No.: 13/962,662

(22) Filed: Aug. 8, 2013

(51) Int. Cl.
  *G06F 11/36* (2006.01)
  *H04L 12/26* (2006.01)

(52) U.S. Cl.
  CPC ........ *G06F 11/3672* (2013.01); *G06F 11/3684* (2013.01); *H04L 43/50* (2013.01)

(58) Field of Classification Search
  CPC ............ G06F 11/3672; G06F 11/3684; G06F 11/3688; H04L 43/50
  See application file for complete search history.

(56) References Cited

U.S. PATENT DOCUMENTS

| | | | |
|---|---|---|---|
| 4,953,084 A | 8/1990 | Meloy et al. | |
| 5,157,779 A * | 10/1992 | Washburn ........... | G06F 11/3414 714/37 |
| 5,715,373 A * | 2/1998 | Desgrousilliers et al. ...... | 706/47 |
| 6,131,188 A | 10/2000 | Goebel | |
| 6,145,122 A | 11/2000 | Miller et al. | |
| 6,151,701 A | 11/2000 | Humphreys et al. | |
| 6,598,221 B1 | 7/2003 | Pegatoquet et al. | |
| 6,829,733 B2 | 12/2004 | Richardson et al. | |
| 7,051,238 B2 | 5/2006 | Gardner et al. | |
| 7,334,219 B2 * | 2/2008 | Cebula ................ | G06F 11/3688 714/38.14 |
| 7,418,697 B2 | 8/2008 | Gryko et al. | |
| 7,484,122 B2 * | 1/2009 | Natarajan et al. ............... | 714/31 |
| 7,805,707 B2 | 9/2010 | Pouliot | |
| 7,870,540 B2 | 1/2011 | Zare et al. | |
| 7,991,747 B1 | 8/2011 | Upadhyay et al. | |
| 8,352,903 B1 * | 1/2013 | Friedman .................. | G06F 8/30 717/100 |
| 8,370,810 B2 | 2/2013 | Oda | |
| 8,479,166 B2 | 7/2013 | Nir-Buchbinder et al. | |
| 8,504,987 B2 | 8/2013 | Li et al. | |
| 8,671,080 B1 | 3/2014 | Upadhyay et al. | |
| 9,098,634 B2 * | 8/2015 | Busi ..................... | G06F 11/3684 |
| 2002/0010710 A1 | 1/2002 | Binnig | |
| 2002/0029377 A1 * | 3/2002 | Pavela ........................... | 717/124 |
| 2002/0040470 A1 | 4/2002 | Guthrie et al. | |
| 2002/0166081 A1 | 11/2002 | Richardson et al. | |

(Continued)

OTHER PUBLICATIONS

Wikipedia's Superuser historical version from Jul. 11, 2013 https://en.wikipedia.org/w/index.php?title=Superuser&oldid=563811039.*

(Continued)

*Primary Examiner* — Joseph Schell
(74) *Attorney, Agent, or Firm* — McDonnell Boehnen Hulbert & Berghoff LLP

(57) ABSTRACT

Systems and methods are described for generating a test executable used for testing an application locally on a host device. A user interface allows selection of particular test modules for use. Based on the selected modules a test executable is generated. The test executable functionality may integrated with the application or be independent of the application. The host device executes the test executable which enables testing and debugging on the local device.

20 Claims, 14 Drawing Sheets

(56) References Cited

U.S. PATENT DOCUMENTS

| | | | | |
|---|---|---|---|---|
| 2003/0221184 | A1* | 11/2003 | Gunjal et al. | 717/118 |
| 2004/0194072 | A1 | 9/2004 | Venter | |
| 2005/0273776 | A1 | 12/2005 | Guilford | |
| 2005/0278707 | A1 | 12/2005 | Guilford | |
| 2006/0059253 | A1 | 3/2006 | Goodman et al. | |
| 2006/0129992 | A1* | 6/2006 | Oberholtzer et al. | 717/124 |
| 2006/0242709 | A1 | 10/2006 | Seinfeld et al. | |
| 2007/0271282 | A1* | 11/2007 | Boren | 707/100 |
| 2007/0288644 | A1 | 12/2007 | Rojas et al. | |
| 2009/0150420 | A1 | 6/2009 | Towner | |
| 2011/0047597 | A1 | 2/2011 | Mahaffey et al. | |
| 2011/0078663 | A1* | 3/2011 | Huang et al. | 717/126 |
| 2011/0289483 | A1 | 11/2011 | Williams et al. | |
| 2012/0260344 | A1 | 10/2012 | Maor et al. | |
| 2013/0060890 | A1 | 3/2013 | Lee et al. | |
| 2013/0152047 | A1 | 6/2013 | Moorthi et al. | |
| 2013/0185798 | A1 | 7/2013 | Saunders et al. | |
| 2013/0227636 | A1 | 8/2013 | Bettini et al. | |
| 2013/0276061 | A1 | 10/2013 | Chebiyyam et al. | |
| 2013/0282892 | A1 | 10/2013 | Levi et al. | |
| 2014/0020096 | A1 | 1/2014 | Khan et al. | |
| 2014/0082729 | A1 | 3/2014 | Shim et al. | |
| 2014/0129173 | A1* | 5/2014 | Kit | 702/123 |
| 2014/0245070 | A1* | 8/2014 | Rumble | 714/38.14 |

OTHER PUBLICATIONS

Wikipedia's Dynamic-link Library historical version from Jul. 31, 2013 https://en.wikipedia.org/w/index.php?title=Dynamic-link_library&oldid=5665613461.*

Wikipedia's Blade server historical version from Jul. 20, 2013 https://en.wikipedia.org/w/index.php?title=Blade_server&oldid=565083280.*

"debugserver", [online] [retrieved on Apr. 22, 2014] Retrieved from the Internet: <http://iphonedevwiki.net/index.php/Debugserver>.

Chowdhury, "Non Final Office Action dated Feb. 13, 2014", U.S. Appl. No. 13/631,919, The United States Patent and Trademark Office, Feb. 13, 2014.

Lldbilvm.Org, "The LLDB Debugger", [online] [retrieved Apr. 22, 2014] Retrieved from the Internet: <http://lldb.llvm.org/>.

Charles Lu, "Debug Java applications remotely with Eclipse", developerWorks, IBM, Dec. 9, 2008, [online] [retrieved on Apr. 22, 2014] Retrieved from the Internet: <http://www.ibm.com/developerworks/library/os-eclipse-javadebug/index.html>.

Javin Paul, "How to setup Java remote debugging in Eclipse", Javarevisited-Blog about Java programming language, FIX Protocol, Tibco Rendezvous and related Java technology stack, Feb. 25, 2011, [online] [retrieved Apr. 22, 2014] Retrieved from the Internet: <http://javarevisited.blogspot.com/2011/02/how-to-setup-remote-debugging-in.html>.

Pyzocha, "Non Final Office Action dated May 13, 2014", U.S. Appl. No. 13/655,667, The United States Patent and Trademark Office, May 13, 2014.

Bakos, et al., "Lightweight Error Correction Coding for System-Level Interconnects", IEEE Transactions on Computers, vol. 56, No. 3, Mar. 2007, pp. 1-16 [online], [retrieved on Jul. 2, 2014]. Retrieved from the Internet <URL:http://kona.ee.pitedu/steve/Recent%20Publications/TC_2007_TC-0414-1105-1.pdf>.

Chowdhury, "Notice of Allowance dated Jul. 2, 2014", U.S. Appl. No. 13/631,919, The United States Patent and Trademark Office, Jul. 2, 2014.

Coyer, "Non Final Office Action dated Jun. 5, 2014", U.S. Appl. No. 13/721,632, The United States Patent and Trademark Office, Jun. 5, 2014.

Dearle, "Software Deployment, Past, Present and Future", IEEE 2007, pp. 1-16 [online], [retrieved on Jul. 2, 2014]. Retrieved from the Internet <URL:http://www.cs.tufts.edu/comp/250SA/papers/dearle2007.pdf>.

Guglielmo, et al., "Model-Driven Design and Validation of Embedded Software", 2011 ACM, pp. 98-104 [online], [retrieved on Jul. 2, 2014]. Retrieved from the Internet <URL:http://dbonline.igroupnet.com/ACM.TOOLS/Rawdata/Acm1106/fulltext/1990000/1982616/p98-guglielmo.pdf>.

Rueher, et al., "Capturing Software Processes Through the Generated Objects", 1988, pp. 148-152 [online], [retrieved on Jul. 2, 2014]. Retrieved from the Internet <URL:http://delivery.acm.org/10.1145/80000/75138/p148-rueher.pdf>.

Pyzocha, "Non Final Office Action dated Sep. 9, 2014", U.S. Appl. No. 13/655,667, The United States Patent and Trademark Office, Sep. 9, 2014.

Seo, et al., "Analysis on maliciousness for mobile applications", 2012 Sixth International Conference on Innovative Mobile and Internet Services in Ubiquitous Computing, IEEE, 2012, pp. 126-129.

* cited by examiner

SYSTEM FOR MODULE SELECTION IN SOFTWARE APPLICATION TESTING INCLUDING GENERATING A TEST EXECUTABLE BASED ON AN AVAILABILITY OF ROOT ACCESS

BACKGROUND

With the growing popularity of computing devices, there is an increasing demand for applications, or apps, to run on such devices. These devices may include smartphones, tablet computers, televisions, set-top boxes, in-vehicle computer systems, home entertainment systems, wearable devices, and so forth. To satisfy this demand, programmers are constantly building, testing, and maintaining applications. To ensure high quality and to identify problems, many app developers test their apps before launching them to the public.

Figure 1:
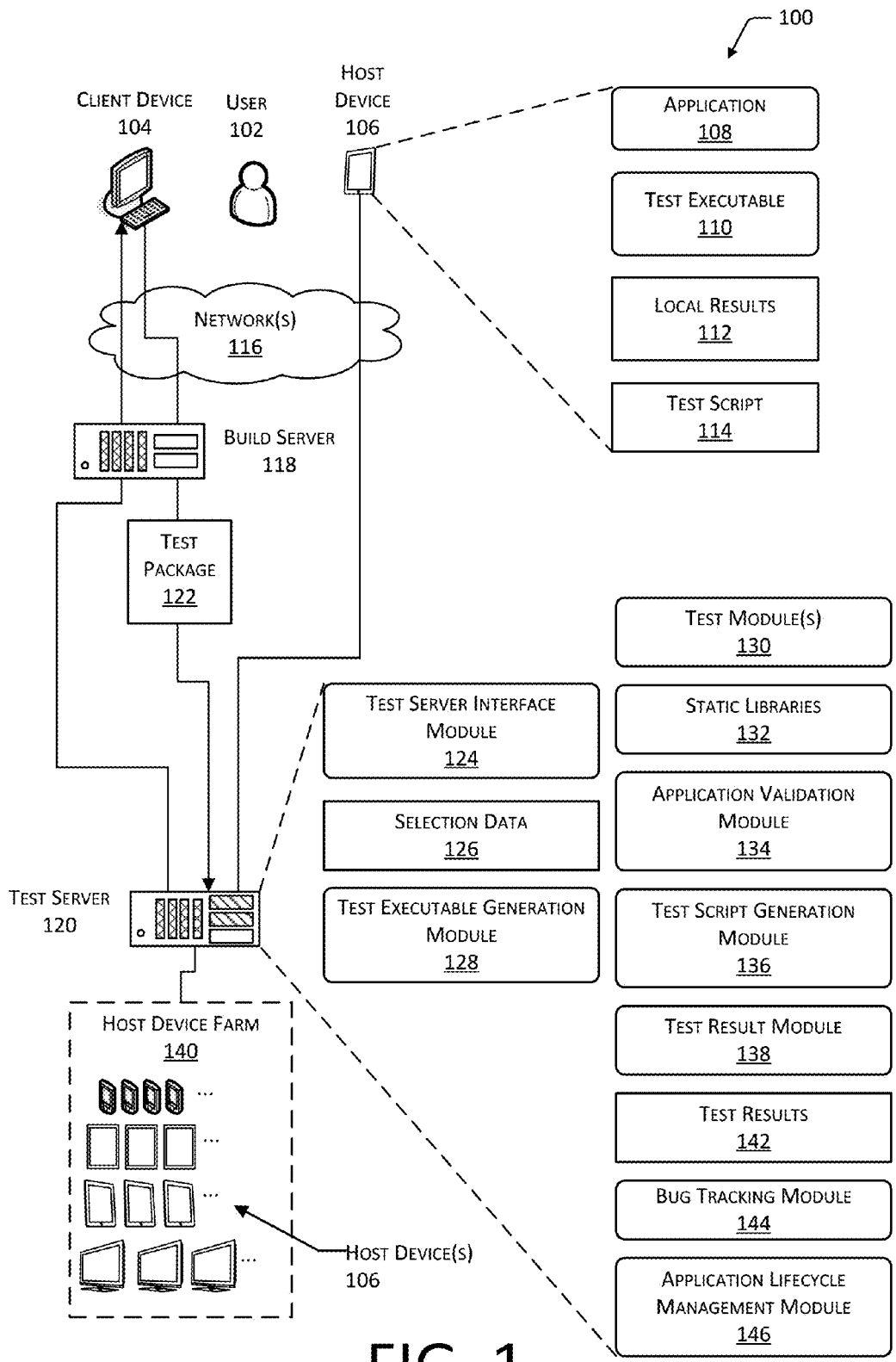
FIG. 1 depicts a system configured to generate a test executable with one or more test modules for use on a portable host device to test an application.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

INCORPORATION BY REFERENCE

U.S. patent application Ser. No. 13/619,867, filed on Sep. 14, 2012, titled "Remote Control of a Mobile Device" to Manish Lachwani, et al. is incorporated by reference into this disclosure.

U.S. patent application Ser. No. 13/680,671, filed on Nov. 19, 2012, titled "Configurable Network Virtualization" to Manish Lachwani, et al. is incorporated by reference into this disclosure.

U.S. patent application Ser. No. 13/631,919, filed on Sep. 29, 2012, titled "Application Validation Through Object Level Hierarchy Analysis" to Manish Lachwani, et al. is incorporated by reference into this disclosure.

U.S. patent application Ser. No. 13/655,667, filed on Oct. 19, 2012, titled "Application Auditing Through Object Level Code Inspection" to Manish Lachwani, et al. is incorporated by reference into this disclosure.

U.S. patent application Ser. No. 13/721,632, filed on Dec. 20, 2012, titled "System For Testing Markup Language Applications" to Manish Lachwani, et al. is incorporated by reference into this disclosure.

U.S. patent application Ser. No. 13/741,989, filed on Jan. 15, 2013, titled "Application Testing System With Application Programming Interface" to Manish Lachwani, et al. is incorporated by reference into this disclosure.

U.S. patent application Ser. No. 13/862,240, filed on Apr. 12, 2013, titled "Test Automation API For Host Devices" to Manish Lachwani, et al. is incorporated by reference into this disclosure.

U.S. patent application Ser. No. 13/868,560, filed on Apr. 23, 2013, titled "Test Script Generation" to Manish Lachwani, et al. is incorporated by reference into this disclosure.

DETAILED DESCRIPTION

A wide variety of applications (or "apps") are developed for execution on host devices such as smartphones, tablet computers, televisions, set-top boxes, in-vehicle computer systems, home entertainment systems, wearable devices, and so forth. There is an increasing demand for software users to build apps to run on such devices. Software users build, test, and maintain applications using a variety of development and build tools. Testing provides many benefits including finding and correcting errors, improving performance, and so forth. Testing may include observing processor usage, observing memory allocation, programmatic debugging, determining usability, validating functionality, identifying regressions, and so forth.

Application testing may involve the use of testing applications using a client device or server. For example, a client device may execute the testing applications and an emulator to simulate the host device operation and execute the application undergoing test. Application testing may also use one or more host devices tethered to client devices or servers, with the host devices executing the application under test. The testing applications may run and gather information about, or otherwise interact with, the application under test using the tethered connection.

With an increasingly mobile workforce, and users who may develop software full- or part-time, the time and place for application development and testing may be anywhere. The user may have the time, desire, or the need to test, debug, update bug tracking information, and so forth from an office, while flying on an airplane, at a client site, and so forth. Traditional application testing systems have used resources external to the host device during operation. For example, the user may need to have a laptop or other client device able to tether the host device for testing. Or the user may need to have network access to access and remotely control host devices in a host device farm.

Described in this application are systems and techniques for providing application functionality to a host device. The user may use a user interface to select a subset of one or more test modules from available test modules. These test modules provide one or more functions associated with application testing. Once selected, these modules are used to construct a test executable for deployment to, and execution on, the host device. For example, the user may be testing an application such as a calculator which executes natively on the host device and has no network connectivity features. The subset of test modules selected may include a native debugger while omitting a hypertext markup language version 5 ("HTML5") debugger and network capture module.

With the user interface, the user is able to select desired or useful test modules to designate tools or functions relevant to the particular application or applications under test. This reduces the size and complexity of the test executable compared to a test executable which includes all test modules. This further minimizes the resources used by the test executable on the host device. These resources may include memory storage space, processor usage, and so forth. As a result, the test executable may be used on resource constrained host devices such as smartphones, tablets, in-vehicle systems, and so forth.

The operating system of the host device may be configured to segregate executing applications into different virtual compartments sometimes known as "sandboxes" or "jails". Each sandbox provides restricted access to system resources such as the filesystem, hardware, and so forth. Applications executing in different sandboxes may be unable to access shared memory, operating system state information, and so forth. These techniques may be used to improve stability of the host device, reduce the likelihood or severity of security breaches, and so forth.

The operating system may be configured to provide root access to applications. Root access may include permissions, rights, and so forth which enable the application to interact with other applications, bypassing the "sandboxes". With root access, the operating system may be modified, log information may be accessible, filesystem access may be unrestricted, and so forth. The root access may also be known as "superuser", "admin", "administrator", and so forth.

A "jailbroken" device is a host device in which root access is available. The root access may be available by the manufacturer of the operating system, or may be provided using third-party tools. A "non-jailbroken" or "jailed" device is one in which root access is unavailable.

A test executable generation module is configured to generate a test executable. The test executable may be selected based on user input, information indicative of root access being available on the host device, and so forth. The test executable includes the selected one or more test modules. The test executable is provided to, and executed on, the host device as a standalone application. During execution, the test executable is configured to perform one or more functions associated with application testing. The test executable in this implementation is able to provide application testing to one or more other applications executing on the host device. For example, the test executable may be used to gather information for comparison of two applications executing on the host device. This information may be used for benchmarking, evaluation, and so forth of the application under test with another application.

In comparison, when root access is unavailable on the host device, the sandboxing may prevent the test executable from interacting with the application under test. In this situation, or upon user selection, the test executable generation module may assemble one or more static libraries which provide the functionality associated with the one or more selected test modules. The static libraries are provided to the user and are configured to be linked or otherwise included during compiling of the application to be tested. Additional code may also be provided which allows the user to invoke a user interface to manipulate the functions provided by the static libraries. The user may use a compiler on the client device or the host device to generate the test executable which includes the application and the static libraries. The test executable may then be executed on the host device, including the testing functionalities associated with the static libraries. Because root access is unavailable, the test executable may be unable to analyze other applications in different sandboxes.

The testing functionality may include code debugging tools, bug tracking functions, performance assessment information, test case creation tools, and so forth. For example, a recording module may be configured to record user inputs and full motion video of screenshots.

The user may thus tailor the test executable to the needs of the particular application, testing situation, project requirements, and so forth. The test executable may omit any functions which are unused or unnecessary in a particular situation. Because the test executable is easily generated using the user interface, as the needs of the user change, the test executable may be readily updated and test modules added or removed. Furthermore, the test executable may be self-contained, allowing the user to continue development when other hardware or network resources are unavailable. For example, the user may be testing a smartphone application while on a train with no internet access and carrying nothing more than the smartphone itself.

When the user desires, such as upon arriving at the office where network connectivity is available, test results, bug information, test scripts, and so forth may be transferred to the client device, a server, and so forth. For example, the user may send a test script generated on the host device to a server for use on a plurality of host devices in a host device farm coupled to the server. Thus, the user is able to take advantage of the standalone and connected operation.

Illustrated Environment

FIG. 1 depicts a system 100 configured to generate a test executable with one or more test modules for testing an application on a host device. One or more users 102, such as software developers, quality assurance testers, and so forth, may use one or more client devices 104, host devices 106, or both. The client devices 104 may be configured to aid in software development and may include laptop computers, desktop computers, terminals, and so forth. The host devices 106 may include an application 108 undergoing initial development, ongoing development, maintenance, and so forth. The host devices 106 may include smartphones, tablet computers, televisions, set-top boxes, in-vehicle computer systems, home entertainment systems, and so forth.

The application 108 may be a native application (or "app"), a markup language application, hybrid app, or a browser-based application. Native applications are those which are written and compiled for execution on the particular device. For example, native applications may be written in a programming language such as C++ or Objective C and compiled into native code such as a binary executable for use on the device. Markup language applications include one or more instructions in a markup language which may be rendered by a layout engine and one or more instructions in a scripting language which may be interpreted by a scripting language engine during execution. For example, a hypertext markup language ("HTML") version 5 (or greater) markup language application may include HTML, cascading style sheets ("CSS"), and JavaScript. In some implementations the markup language application may have multiple instances of the UIWebView class references. Hybrid applications include native code and markup language application portions. Browser-based applications are processed within a web browser application and are limited in execution. The browser-based applications may have only a single UIWebView instance.

The host device 106 may also include a test executable 110. The test executable 110 may comprise a binary suitable for execution on the host device 106. The test executable 110 is configured to provide one or more functions associated with testing, evaluating, monitoring, and so forth, of the application 108. These functions may include runtime debuggers, performance monitoring, test script generation, automated testing, and so forth. Functionality, generation, and other details about the test executable 110 are discussed below in more detail. The test executable 110 may be configured to generate output such as local results 112. The local results 112 may include bug reports, crash logs, input data, input event data, and so forth. The local results 112 may include diagnostic output, testing outputs, screenshots of one or more of the displays of the host device 106, and so forth. The screenshots may be stored as still images, or combined to form a video stream representative of information presented on the display of the host device 106. The screenshots generated as the host device 106 executes the application 108 may be accessed for analysis, presentation to the user 102, stored, and so forth. The local results 112 may include information about one or more of the applications 108 executing on the host device 106.

The test executable 110 may also be configured to generate one or more test scripts 114. The test scripts 114 may be based on input data of the interaction of the user 102 with the application 108 on the host device 106. The input data comprises information which is provided as input to the application 108. The input data may include touches on a touchscreen of the host device 106, button presses on the host device 106, or information from other sensors which is used by the application 108. Input event data is generated from the input data. The input event data comprises information indicative of input to the host device 106 and associated application objects. The test scripts 114 may be provided in various formats, such as the Ruby language as created by Yukihiro Matsumoto and derivatives, the UIAutomation framework promulgated by Apple Corp. of Cupertino, Calif., and so forth.

The devices in the system 100 may communicate with one another using one or more networks 116. The networks 116 may include public networks such as the Internet, private networks such as an institutional and/or personal intranet, or some combination of private and public networks. The networks 116 may also include any type of wired and/or wireless network, including but not limited to local area networks (LANs), wide area networks (WANs), Wi-Fi, WiMax, and mobile communications networks (e.g. 3G, 4G, and so forth). The networks 116 may utilize communications protocols, including packet-based and/or datagram-based protocols such as internet protocol (IP), transmission control protocol (TCP), user datagram protocol (UDP), or other types of protocols.

A build server 118 may be used by the developer user 102 to assist in development of the application 108. In some implementations one or more of the functions associated with the build server 118 may be provided by the client device 104.

The build server 118 may comprise one or more modules. These modules are discussed below in more detail with regard to FIG. 8. In some implementations the application 108 as built may include executable binaries, markup language applications, and so forth. In some implementations the users 102 may use the build server 118 to implement a continuous integration methodology of software development in which workspaces of the users 102 are merged frequently, such as several times per day.

The build server 118 may be configured to implement, or work in conjunction with systems implementing one or more of the Rational ClearCase family of tools from IBM Corp, the Hudson tool developed at least in part by Kohsuke Kawaguchi and available at hudson-ci.org, the Jenkins tool as forked from Hudson and promulgated by Kohsuke Kawaguchi which is available at jenkins-ci.org, Perforce from Perforce Software Inc. of Alameda, Calif., or GitHub from GitHub, Inc. of San Francisco, Calif.

The build server 118 may communicate with a test server 120 using the network 116. The build server 118 is configured to generate the application 108 for execution on the host device 106. In some implementations, the build server 118 may also be configured to generate and send a test package 122 to the test server 120. In some implementations, the test package 122 may include an access token. The test package 122 may comprise tests, test scripts, configuration data, build information, and so forth. The build server 118 may send the application 108 and test package 122 using a uniform resource locator ("URL") which is associated with a particular account on the test server 120. The URL used by the build server 118 to send the test package 122 may be unique to a particular user 102, group of users 102, build server 118, entity, organization, and so forth. Alternatively, the build server 118 may indicate a raw file path corresponding to the location of the application 108 and the test package 122 on a client device 104.

The test server 120 comprises a test server interface module 124. The test server interface module 124 may be configured to accept and respond to the application 108 and the test package 122 sent by the build server 118. The exchange of information between the build server 118 and the test server 120 may be encrypted. For example, transfers of the application 108 and the test package 122 may use hypertext transport protocol secure ("HTTPS").

Figure 2:
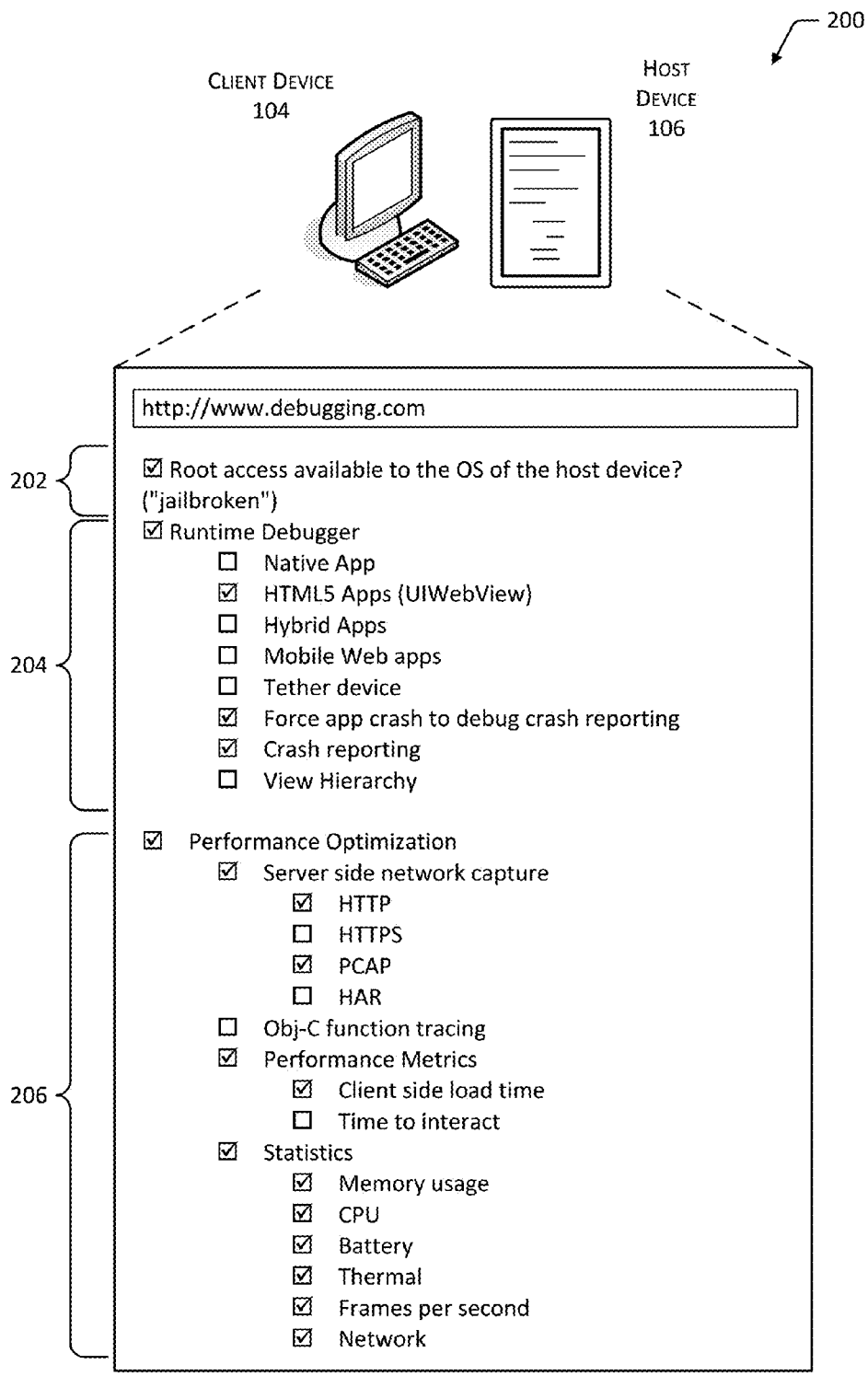
FIGS. 2-3 depict a user interface to select test modules for inclusion in the test executable.
Figure 3:
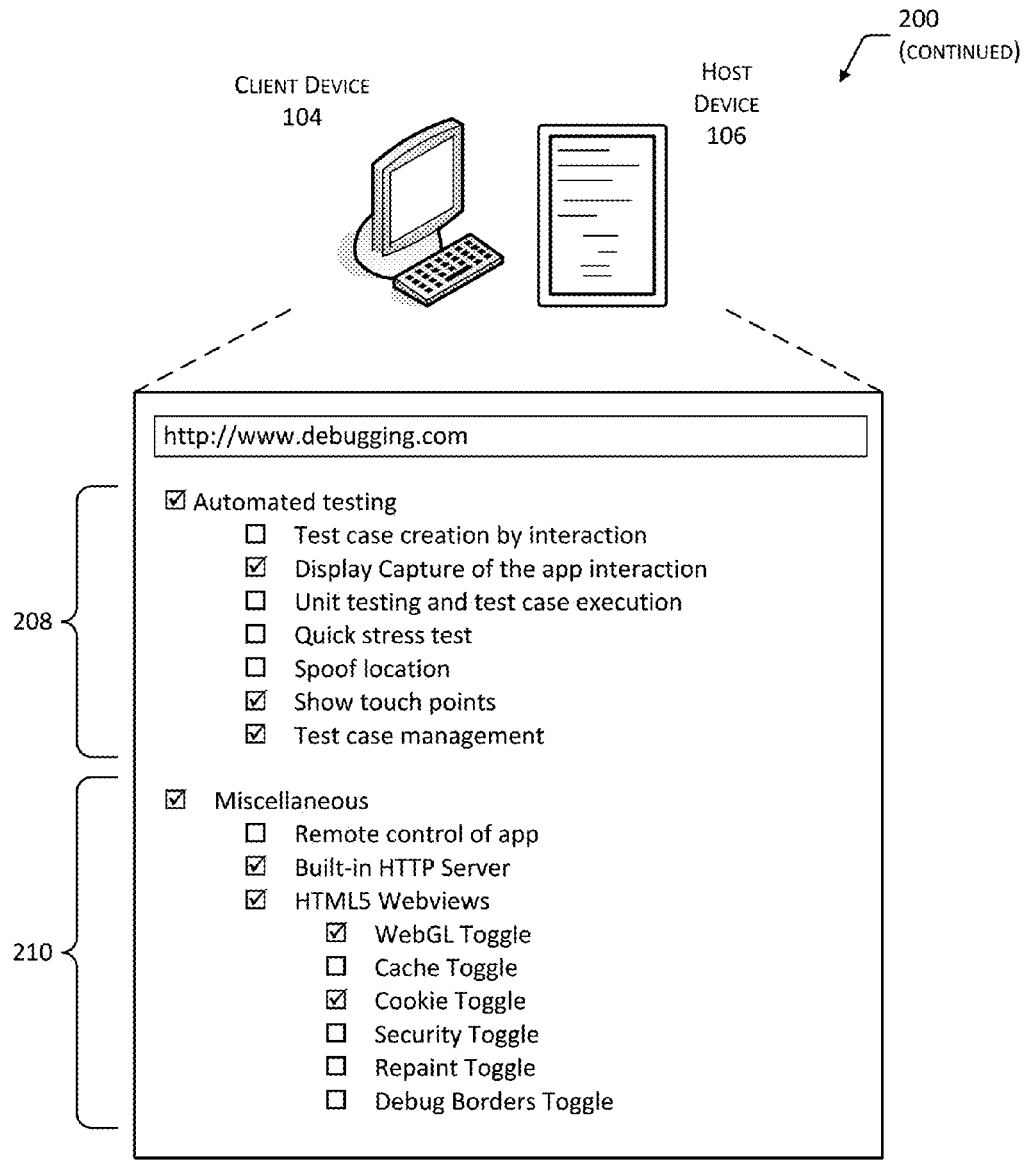

The test server interface module 124 may also be configured to receive selection data 126 from the user 102, such as from the client device 104 or the host device 106 and provide the selection 126 data to a test executable generation module 128. The selection data 126 is described below in more detail. In one implementation the test server interface module 124 may provide a web interface to the user 102. FIGS. 2-3 below depict an example web interface.

As described above, the build server 118 may be configured to implement, or work in conjunction with, various systems to support development. In one implementation the build server 118 may implement a Hudson/Jenkins build server system with plugins configured to interface with the test server 120 using the test server interface module 124. The plugins may allow for opening a specific host device 106 with an installed specific build of the application 108 as a post build option. The plugins may also allow for automated calls to the test server 120 to interact with particular builds.

In some implementations the test server 120 may be configured to work with various tools such as ClearCase, Jenkins, Hudson, Perforce, GitHub, and so forth. Similarly, the test server 120 and the services provided by the test server 120 may be configured to integrate with various SDK. For example, integration may be provided for SDKs promulgated by Sencha Inc. of Redwood City, Calif., PhoneGap by Adobe Systems of San Jose, Calif., AppGyver by AppGyver Inc. of San Francisco, Calif., Eclipse by the Eclipse Foundation of Ottawa, Ontario, and so forth. The test server 120, or portions thereof such as the test server interface module 124, may be customized to allow for integration with particular users 102 or entities.

The selection data 126 provides information indicative of selection of one or more test modules 130 for inclusion in the test executable 110. The selection data 126 may also indicate a preference for an integrated test application, separate test application, and so forth.

The test modules 130 are configured to be operable on the host device 106 and provide one or more functions. The test modules 130 may include, but are not limited to a native application debugger module, a hypertext markup language application debugger module, a network capture module, a function tracing module, a metric module, a statistic module, a test case creation module, a display capture module, a hypertext transport protocol server module, a remote debugger module, or a remote control module.

In some implementations the selection data 126 may include information indicative of the availability of root access on the host device 106, information about characteristics of the host device 106, and so forth. The characteristics of the host device 106 may include one or more of an operating system version, a processor type, an available memory, availability of an input device, universally unique identifier ("UUID"), processor identifier, device identifier, and so forth.

The test executable generation module ("generation module") 128 is configured to accept the selection data 126 and access the test modules 130 indicated in the selection data 126. In one implementation, the generation module 128 may be configured to generate the test executable 110 incorporating these test modules 130, also known as the "separate test executable". For example, where root access is available on the host device 106, the test executable 110 may be provided to the host device 106 as a binary file ready for execution on the host device 106. This test executable 110 may be used to analyze other applications 108 executing on the host device 106.

In another implementation, based on the selection data 126, the generation module 128 provides one or more static libraries 132. These static libraries 132 are configured for compiling by the build server 118 or another device. The static libraries 132 may be provided to the user 102 using the network 116. The static library 132 may be locked for use on the particular host device 106. For example, the static library 132 may incorporate the UUID which is associated with the hardware of the host device 106. The user 102 may then compile the code for their application 108 with the static libraries 132 to generate the test executable 110. The test executable 110 which includes the application 108 and the static libraries 132 may be known as an "integrated test application." This test executable 110 may then be executed on the host device 106. For example, because the testing functionality is available within the test executable 110, testing may take place on the host device 106 for which root access is unavailable in the operating system.

In yet another implementation, the source code for the application 108 may be provided to the test server 120 which may then generate the test executable 110 using the static libraries 132. For example, the user 102 may upload the application 108 source code using the test server interface module 124, and initiate generation of the test executable 110 by compiling the application 108 source code and including the static libraries 132.

An application validation module 134 generates an object level hierarchy for the application, based on the assembly code generated by the assembly code generation module on the host device 106. In some cases, the test server may iteratively query the assembly code on the host device 106 to determine parent/child hierarchical relationships between various objects associated with the application. The object level hierarchy may then be built based on these determined parent/child relationships. In some embodiments, the objects employed to build the object level hierarchy include those objects associated with a particular object type, aspect, or feature set of the application, and may also be known as "application objects". For example, embodiments may provide an object level hierarchy of objects associated with UI elements of the application under validation, or associated with memory management features of the application. The application validation module 134 may also be configured to validate and verify that the application 108 meets design and development requirements.

The application validation module 134 is discussed in more detail with regard to U.S. patent application Ser. No. 13/631,919, filed on Sep. 29, 2012, titled "Application Validation Through Object Level Hierarchy Analysis" to Manish Lachwani, et al. which is incorporated by reference into this disclosure. In some implementations, the object level hierarchy information may be provided to an input event module executing on the host device 106. This information may be used to generate the input event data.

A test script generation module 136 accepts the input event data, containing the input and the associated application objects, and generates one or more test scripts 114. The test scripts 114 may be provided in various formats, such as the Ruby language as created by Yukihiro Matsumoto and derivatives, the UIAutomation framework promulgated by Apple Corp. of Cupertino, Calif., and so forth.

A test result module 138 may be configured to use the one or more test scripts 114 to exercise the application 108 using a host device farm 140. The host device farm 140 comprises a plurality of host devices 106 under the control of the test server 120. The host device farm 140 may include a plurality of host devices 106 which differ from one another. For example, the host device farm 140 may have host devices 106 with different operating systems, operating system versions, hardware configurations, and so forth. The test result module 138 may use the test script 114, such as received from the host device 106 of the user 102, against the devices in the host device farm 140 to generate test results 142. The test server interface module 124 may be used to provide the test results 142 to one or more of the build server 118, the client devices 104, or the host device 106.

The test server 120 may also include a bug tracking module 144. The bug tracking module 144 is configured to maintain information about bugs or issues associated with the application 108. In some implementations, the test modules 130 may include a bug tracking module 144 configured to enable the test executable 110 to interact with the bug tracking module 144. For example, the user 102 while testing on the host device 106 may detect a bug. Without leaving the test executable 110, using the functionality in the test executable 110, the user 102 may report that bug along with pertinent information such as system state, input data, and so forth associated with manifestation of the bug. For example, the bug tracking module 144 may implement at least a portion of the JIRA tools by Atlassian Inc. of Sydney, Australia.

An application lifecycle management module 146 may provide additional functions associated with governance, development, maintenance, and so forth of the application 108. For example, the application lifecycle management module 146 may implement the HP Application Lifecycle Management tools by Hewlett-Packard Company of Palo Alto, Calif. In some implementations, the test modules 130 may include one or more modules configured to interact with the application lifecycle management module 146. For example, the test executable 110 may include a user interface to view application status as maintained by the application lifecycle management module 146 of the test server 120.

The host devices 106 may include smartphones, tablet computers, televisions, set-top boxes, in-vehicle computer systems, home entertainment systems, and so forth. The host device farm 140 may include different varieties of host devices 106. These varieties may reflect differences in hardware, software, configuration, and so forth. For example, the host device farm 140 may include host devices 106 from manufacturer "A", manufacturer "B", and so forth. Furthermore, these host devices 106 may be of different generations, capabilities, and so forth. Continuing the example, the host devices 106 from the manufacturer "A" may include tablet computers, smartphones, and so forth.

In some embodiments, the test server 120 may employ one or more input/output ("I/O") interfaces comprising an electrical or optical connection to couple to the one or more host devices 106 in the host device farm 140. In one embodiment, a universal serial bus ("USB") 2.0 or better connection may be used to communicatively couple the host device 106 to the test server 120. The USB connection may be used to transfer data from the host device 106 to the test server 120 or another test server 120, using TCP as a communication protocol. The data may include the application 108, testing applications, screenshots, test results, diagnostic data, and so forth.

The test server 120 may incorporate other modules. These modules are discussed below in more detail with regard to FIG. 9. For example, the test server 120 may also incorporate a test validation module, a test result module 138, and so forth. The test validation module may be executed to validate and verify that the test package 122 is a valid file type for the particular framework that is used for testing the application 108.

The client device 104, the host device 106, the build server 118, or another device may receive the test results 142, access the local results 112, and so forth. The build server 118 may provide at least a portion of the local results 112, the test results 136, or information based at least in part thereon, to the client device 104 or the host device 106 for presentation to the users 102. In some implementations, the information may be used to indicate portions of the application 108 which have passed or failed testing on the host device 106, the test server 120, or both. The user 102 may also specify how the information is to be presented to the user 102. For example, at least a portion of the local results 112 may be emailed to an email address provided by a user 102, posted to the URL specified by a user 102, and so forth.

The modules of the client device 104, the host device 106, the build server 118, the test server 120, and so forth are described in this disclosure as separate modules. In some implementations at least a portion of the functionality of these modules may be combined into a single module, or incorporated into another module. Additionally, the functionality may be distributed across the various devices. For example, the client device 104 may provide at least a portion of the functionality described by the build server 118.

In some implementations the build server 118, the test server 120, and the host device farm 140 may be operated within an organization, particular network, and so forth. For example, a software development company may choose to implement the system 100 for their internal use only.

Using the system 100, the user 102 may select particular test modules 130 of interest. Based on this selection, the test executable 110 may be generated which incorporates those test modules 130. By using this test executable 110 on the host device 106, the user 102 may readily test their application 108 using hardware they already have access to. Capabilities to use resources external to the host device 106, such as the host device farm 140, the bug tracking module 144, the application lifecycle management module 146, and so forth, may be included in the test executable 110 and accessed as desired by the user 102. As the needs of the user 102 change, new test modules 130 become available, and so forth, the test executable 110 may be easily regenerated.

FIGS. 2-3 depict a user interface 200 to select the test modules 130 for inclusion in the test executable 110. The test server interface module 124 may provide the user interface 200 used to acquire the selection data 126. In one implementation, the user interface 200 may be provided as a web page. For example, the user interface 200 may be presented in a web browser application executing on the client device 104 or the host device 106, as shown here.

By way of illustration and not as a limitation, various options are provided with checkboxes allowing for selection. In other implementations spinners, radio buttons, text input fields, and so forth may be used to acquire the selection data 126. The various options presented in the user interface 200 reflect functions provided by one or more of the test modules 130. The user interface 200 allows the user 102 to select a subset of these test modules 130 for use in the test executable 110.

The user interface 200 may be configured as shown at 202 to provide controls configured to accept information indicative of the root access to the host device 106. As illustrated here, the user 102 has checked the box indicating that they have a jailbroken device in which root access is available. In some implementations the determination of availability of root access may be made automatically. For example, an application configured to detect root access may be installed on the host device 106, executed, determine root access availability, and return this information to the test server 120.

Controls 204 allow the user 102 to specify runtime debugger options. Runtime debuggers may be provided for native applications, HTML5 apps, hybrid apps, mobile web apps, and so forth. By selecting runtime debugger options corresponding to the application 108, the overall size and complexity of the test executable 110 may be reduced, relative to including all of the debugger options. For example, in this illustration the user 102 is testing an HTML5 app, and so chooses only the HTML5 app runtime debugger. As a result, the generation module 128 will include the HTML5 runtime debugger and omit the native app debugger. Other debugging options may also be selected, such as options for tethered execution when coupled to the client device 104, forcing app crash to debug crash reporting, viewing the application object level hierarchy, and so forth.

The user 102 may also use performance optimization controls 206 to select options associated with performance optimization. For example, as shown here the user 102 may select to enable server side network capture of data for hypertext transport protocol ("HTTP") traffic and use the PCAP packet capture functionality. The user 102 has also selected to gather performance metrics such as the client side load time. The user 102 has also selected to gather statistics including memory usage, processor ("CPU") usage, battery condition, thermal data, frames per second of video delivered, and network usage.

FIG. 3 continues the user interface 200 of FIG. 2. Automated testing controls 208 may be presented. These controls 208 allow the user 102 to select options associated with automating the testing of the application 108. For example, here the user 102 has selected the option to include test modules 130 which provide video capture of the application interaction, and has also selected the option to show touch points on a touch sensor in this video capture. Also selected is an option to enable test case management functions for manipulating the test scripts 114 or other testing tools.

Other controls 210 may be provided to allow access to other miscellaneous functions. For example, an option may be provided for the application 108 executing on the host device 106 to be remotely controlled by another device, such as the client device 104. As illustrated here, the controls 210 are selected to provide the built-in HTTP server, and to enable WebGL and Cookie toggles in the HTML5 webviews. These toggles allow the user 102 to set various conditions in the execution environment.

The options selected by the user 102 in the user interface 200 are expressed in the selection data 126. In some implementations, the test server interface module 124 may implement an application programming interface ("API"). This API may be used to receive the selection data 126. For example, software executing on the build server 118 may generate the selection data 126 and provide the selection data 126 to the test server 120 using the API.

Figure 4:
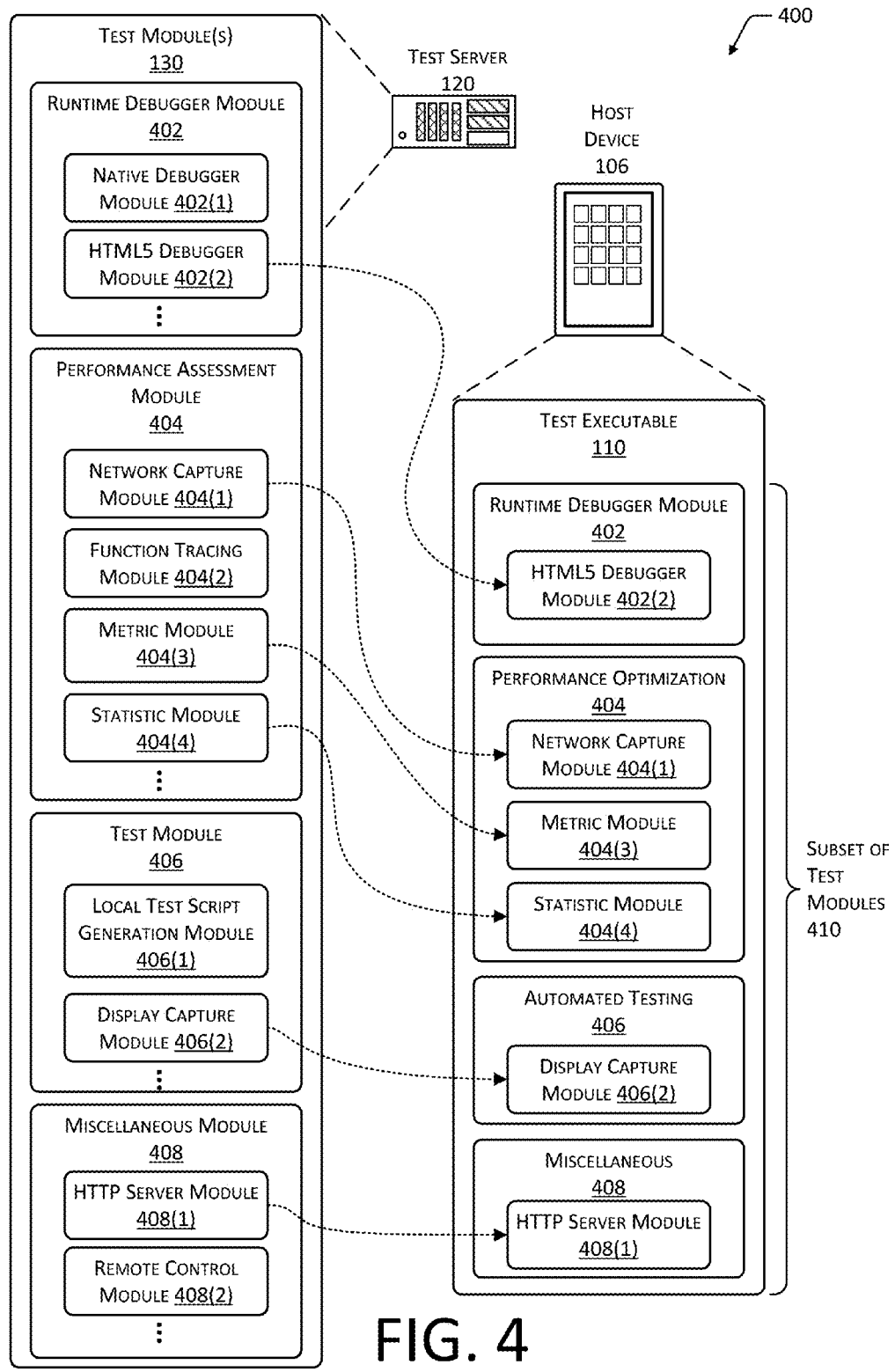
FIG. 4 illustrates a block diagram of generating a test executable having several test modules.

FIG. 4 illustrates a block diagram 400 of generating the test executable 110 incorporating several test modules 130. As described above, the generation module 128 is configured to generate the test executable 110, static libraries 132, or both, based at least in part on the selection data 126. For illustrative purposes, and not by way of limitation, FIG. 4 continues the example presented in FIGS. 2-3.

The test modules 130 may include, but are not limited to runtime debugger modules 402, performance assessment modules 404, testing modules 406, miscellaneous modules 408, and so forth. These modules may, in turn, comprise additional modules.

The runtime debugger modules 402 provide runtime debugging functions. These may include a native debugger module 402(1) configured to debug native applications, an HTML5 debugger module 402(2) configured to debug HTML5 applications, and so forth. Other debugger modules may also be provided, as well as modules supporting runtime debugging operations.

The performance assessment modules 404 provide functions associated with assessing the performance and operation of the application 108, the operating system, the host device 106, and so forth. Illustrated here is a network capture module 404(1). The network capture module 404(1) is configured to store information exchanged between the host device 106 and other devices using the network 116. The function tracing module 404(2) allows for tracing of function entry and exit during execution of the application 108. A metric module 404(3) is configured to gather performance metrics associated with the application 108. These metrics may include client side load time, time to interact, and so forth. The client side load time indicates amount of time required for the application 108 to load. The time to interact provides an indication of how long until the application 108 is responsive to user input. A statistic module 404(4) is configured to acquire one or more statistics associated with the operation and state of the host device 106. For example, the statistics may include memory usage, CPU usage, battery condition, thermal status, frames per second delivered to the display, network usage, and so forth.

The test module 406 provides functionality associated with building, maintaining, and executing tests of the application 108. The test module 406 may include a local test script generation module 406(1). The local test script generation module 406(1) is configured to operate on the host device 106 and generate one or more test scripts 114 using inputs received on the host device 106. These test scripts 114 may then be replayed on the host device 106, or provided to the test server 120 for execution on the host device farm 140. A display capture module 406(2) allows for the capture of screenshots made to the display during execution of the test executable 110, the application 108, or both. By combining these screenshots, video of interactions may be acquired. The screenshot data may be generated using a hardware-based video encoder/decoder of the host device 106. Use of the hardware-based video encoder/decoder allows for the high-fidelity capture and presentation of images presented on the display of the host device 106. This high-fidelity is based on the ability to capture the screenshots at the full resolution and at the full frame rate or redraw rate of the display.

The miscellaneous modules 408 may include an HTTP server module 408(1), remote control module 408(2), and so forth. The HTTP server module 408(1) provides an HTTP server which is configured to execute on the host device 106. This HTTP server may provide functionality to support the testing of the application 108 which is configured to interact with an external server. By loading the HTTP server locally, the user 102 may test the application 108 on the host device 106 without using external resources. For example, while on the train with no network access, the user 102 may continue to run tests on the application 108 which make calls to the external server, which is replaced by the HTTP server module 408(1). The remote control module 408(2) allows another device to remotely control the host device 106. For example, the client device 104, another host device 106(2), and so forth may use the remote control module 408(2) to provide inputs and view outputs even when not physically present at the host device 106.

Based at least in part on the selection data 126, the generation module 128 is configured to generate the test executable 110, one or more static libraries 132, or both. For clarify of illustration and not by way of limitation, the test executable 110 is illustrated here.

A subset of test modules 410 is made from the test modules 130 based on the selection data 126. The test executable 110 depicted in FIG. 4 show the modules which were selected by the user 102 in the user interface 200 and as expressed in the selection data 126. The test executable 110 in this illustration includes the HTML5 debugger module 402(2), the network capture module 404(1), the metric module 404(3), the statistic module 404(4), the display capture module 406(2), and the HTTP server module 408(1). The other test modules 130, not included in the selection data 126, are not included in the subset of test modules 410, and are thus not included in the test executable 110.

As described above, in some implementations the static libraries 132 associated with the subset of test modules 410 may be provided for use. For example, the static libraries 132 may be delivered to the build server 118, or another device for compiling. The device may generate the test executable 110 which incorporates the application 108 and the static libraries 132.

Figure 5:
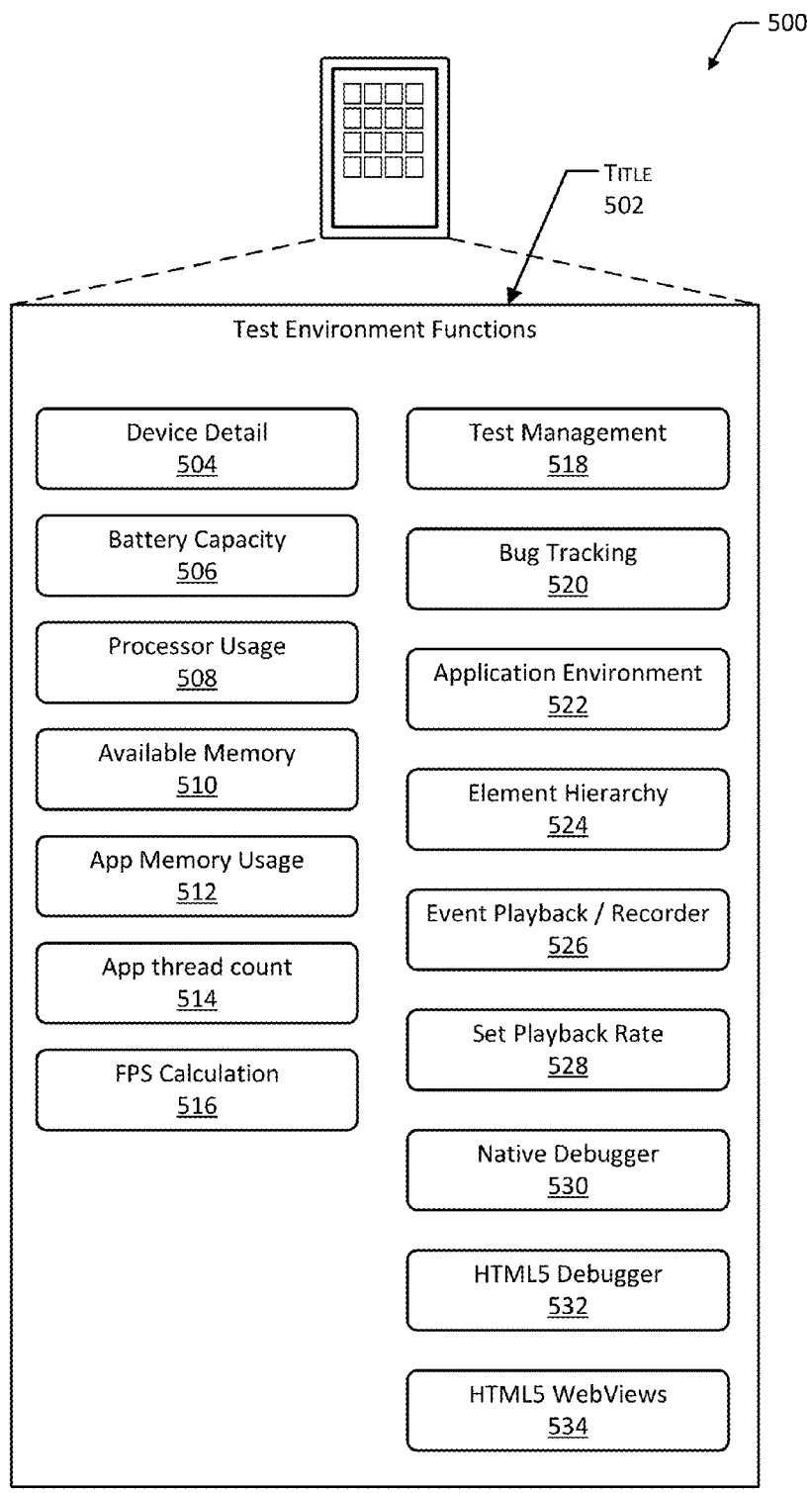
FIGS. 5-7 illustrate user interfaces of the test executable on the host device.
Figure 6:
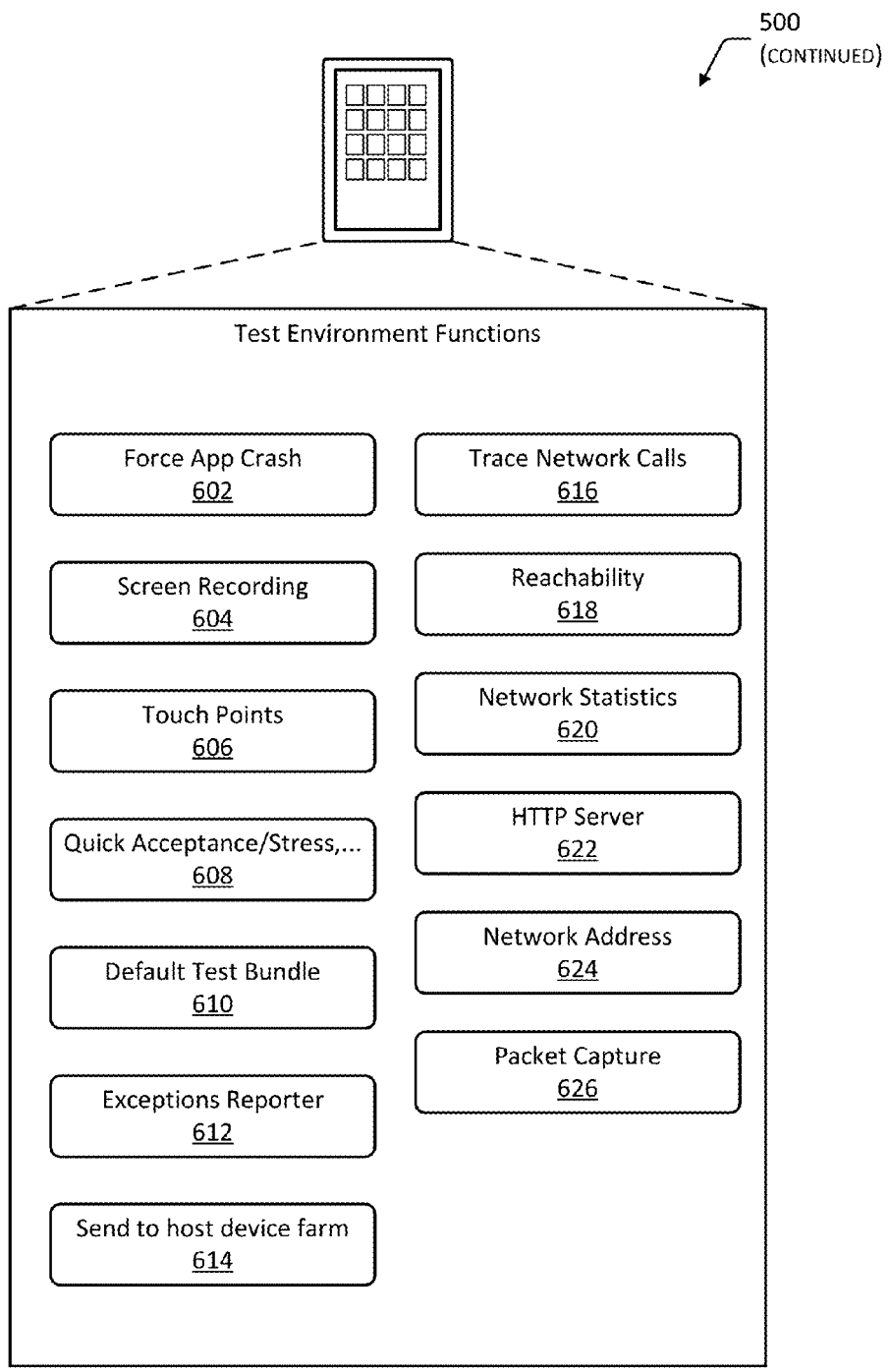
Figure 7:
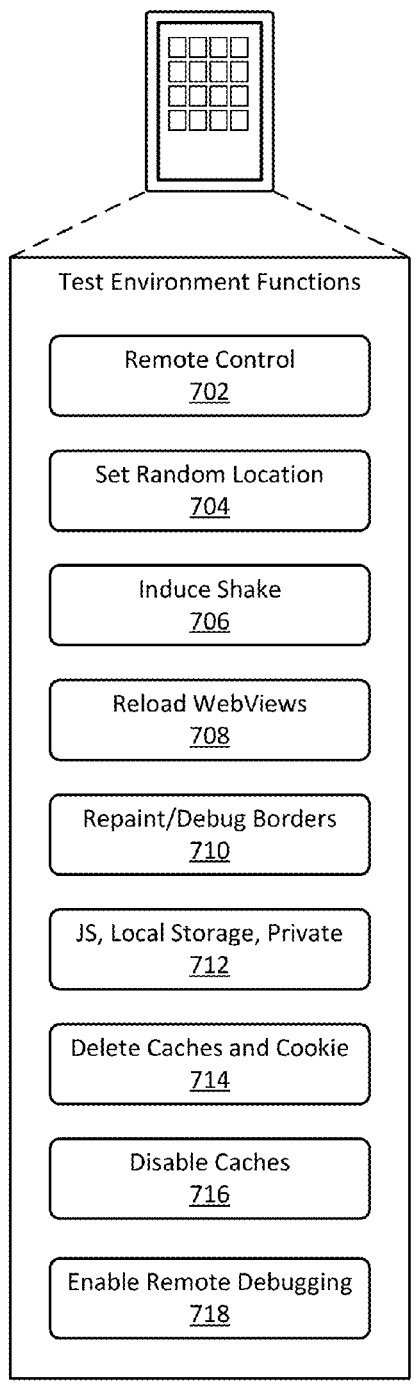

FIGS. 5-7 illustrate a user interface 500 of the test executable 110 on the host device 106. The test modules 130 may include user interface functionality configured to allow the user 102 to interact with the test modules 130 included in the test executable 110. In implementations where the test executable 110 is compiled using the application 108 source code and the static libraries 132, additional code may also be provided which allows the user 102 to invoke the user interface 500.

The following user interface controls may, upon activation by the user 102, provide additional information, present one or more additional controls, and so forth. The following controls are provided by way of illustration, and not as a limitation. This illustration depicts a full set of the available controls. During actual deployment, depending upon the selection data 126, one or more of the following controls may be omitted or unavailable.

The user interface 500 may include a title 502 which may provide information to the user 102 that they are not viewing the user interface associated with the application 108. Some of the controls may be associated with the host device 106. A device detail control 504 may provide information about the host device 106 upon activation. For example, hardware version, operating system and version, memory available, list of executing applications 108, and so forth. A battery capacity 506 control allows for presentation of information about the power state of the host device 106. A processor usage 508 control provides information about the processors. An available memory 510 control provides information about storage space on the host device 106. An app memory usage 512 control provides information about the memory used by the application 108. An app thread count 514 control provides information about the threads executing which are associated with the application 108. An FPS calculation 516 control enables functionality to determine how many frames per second are being presented to the display of the host device 106.

Some controls allow the user 102 to gather information about the application 108, testing, and so forth. A test management 518 control allows the user 102 to manage test information such as test cases, test scripts 114, and so forth. A test case may include one or more conditions or variables under which the application 108 is determined to be working as intended. For example, the test management control 518 may be configured to enable the user 102 to list existing test cases, generate new test cases, run test cases, and so forth.

A bug tracking 520 control allows the user 102 to access the functionality associated with the bug tracking module 144. An application environment 522 control allows the user 102 to view, modify, or otherwise interact with environment variables in use by the application 108. An element hierarchy 524 control allows for the inspection of user interface elements of the application 108.

An event playback/recorder 526 control allows the user 102 to store and replay events occurring on the host device 106. A set playback rate 528 control allows the user 102 to change a speed of the playback.

A native debugger 530 control allows the user 102 to interact with the native debugger, such as provided by the native debugger module 402(1). Likewise, an HTML5 debugger 532 control allows for interaction with the HTML5 debugger, such as provided by the HTML5 debugger module 402(2). An HTML5 WebViews 534 control allows the user 102 to interact with the WebViews associated with the application 108.

FIG. 6 continues the user interface 500 of FIG. 5. Additional controls may be provided for testing the application 108. A force app crash 602 control is configured to generate a crash of the application 108. This may be used to test crash reporting of the application 108. A screen recording control 604 lets the user 102 turn on, off, or otherwise control the recording of screenshots of the information presented on the display of the host device 106. Touch points 606 control allows for configuring a visual cue to be generated on the display corresponding to a touch on a touch sensor. For example, a circle around the point where a user 102 touches the touch sensor.

A quick acceptance/stress test 608 control is configured to execute a predefined set of tests to stress the application 108. These tests may be defined by the user 102, provided by the test server 120, or another entity.

A default test bundle 610 allows for execution of predefined tests. An exceptions reporter 612 control allows for the control over crash reporting and handling. A control to send to host device farm 614 may be provided. Upon activation, one or more of information about the application 108, current test case, test scripts 114, and so forth, may be sent to the test server 120 for execution on the host device farm 140.

Some controls may be provided which are associated with networking. A trace network calls 616 control manipulates the tracing of network calls by the application 108. A reachability control 618 is configured to generate an HTTP GET or other command to one or more addresses associated with the application 108. A resulting response, or lack thereof, from these addresses is used to determine whether the service called is reachable.

A network statistics 620 control allows for the viewing of information about performance of a networking stack, information about data transfer involving the host device 106, and so forth. An HTTP server control 622 allows the user 102 to enable, disable, configure, and otherwise interact with the HTTP server executing on the host device 106, such as provided by the HTTP server module 408(1).

A network address 624 control may provide information about how the network interface is configured, gateway information, and so forth. A packet capture 626 control allows the user 102 to manipulate package capture of data to and from the network 116 by the host device 106.

FIG. 7 continues the illustration of the user interface 500. Other miscellaneous controls may also be provided. A remote control 702 control may provide functions to enable, disable, and configure remote control of the host device 106 by another device. For example, the remote control 702 may manipulate operation of the remote control module 408(2).

A set random location 704 control sets the host device 106 to report a geographic location which differs from that as detected by an onboard positioning system of the host device 106. For example, the global positioning system receiver of the host device 106 may report a location of N 49.123 W 119.112, but after activation of the set random location 704 control, the location may change to N 48.002 W 118.921. The set random location 704 control may be configured to operate within predetermined boundaries, such as within a radius of a specified point, within limits of a particular city, and so forth.

An induce shake 706 control is configured to simulate the host device 106 being shaken, and the corresponding output from sensors onboard the host device 106. For example, the user 102 may use the induce shake 706 while remotely controlling the host device 106 to simulate picking up and shaking the host device 106. Other controls may allow for inducing touch inputs and so forth.

A reload WebViews 708 control allows for manually refreshing the WebViews. Likewise, a repaint/debug borders 710 control allows the user 102 to manually repaint borders in the application 108, and so forth.

A JavaScript ("JS") 712 control allows for manipulation of how JavaScript is processed by the application 108. For example, the JS control 712 may allow for configuration of local storage, control over access to the data of the application 108, and so forth.

A delete caches and cookie 714 control is configured to allow manipulation of the caches and cookies stored on the host device 106. The user 102 may use a disable cache 716 control to turn off caches on the host device 106. An enable remote debugging 718 control may be configured to enable support for remote debugging. During remote debugging, the host device 106 is tethered to the client device 104, and one or more of the test modules 130 of the test executable 110 support interaction between a debugger executing on the client device 104 and the application 108 executing on the host device 106.

Figure 8:
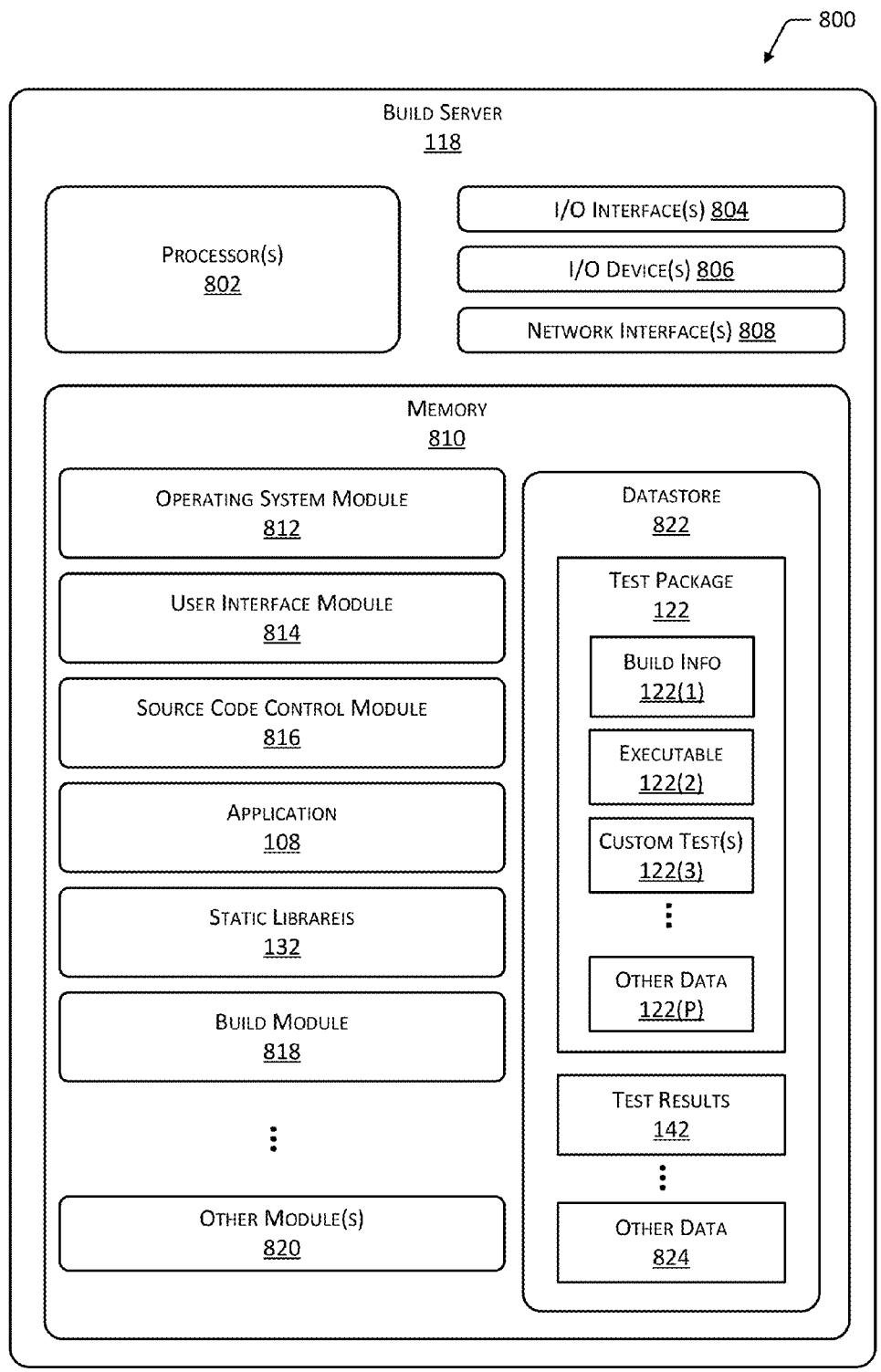
FIG. 8 depicts a block diagram of a build server configured to compile a test executable from application source code and one or more static libraries.

FIG. 8 depicts a block diagram 800 of the build server 118 configured to facilitate development of the application 108 by generating the test executable 110 from application code and the static libraries 132. The test executable 110 may then be provided to the host device 106. The build server 118 may include one or more processors 802 configured to execute one or more stored instructions. The processors 802 may comprise one or more cores.

The build server 118 may include one or more input/output (I/O) interface(s) 804 to allow the build server 118 to communicate with other devices. The I/O interface(s) 804 may couple to one or more I/O devices 806. In some embodiments, the I/O device(s) 806 may be physically incorporated with the build server 118 or be externally placed.

The build server 118 may also include one or more network interfaces 808 to enable communications between the build server 118 and other networked devices. Such network interface(s) 808 may include one or more network interface controllers (NICs) or other types of transceiver devices configured to send and receive communications over the network(s) 118. For example, the network interface(s) 808 may be configured to provide a Wi-Fi connection compliant with one or more IEEE 802.11 standards such as 802.11g or 802.11n. The build server 118 may also include one or more busses or other internal communications hardware or software that allow for the transfer of data between the various modules and components of the build server 118.

The build server 118 includes one or more memories 810. The memory 810 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 810 provides storage of computer readable instructions, data structures, program modules, and other data for the operation of the build server 118.

The memory 810 may include at least one operating system ("OS") module 812. The OS module 812 is configured to manage hardware resources such as the I/O interface(s) 804 and network interface(s) 808, and to provide various services to applications or modules executing on the processor(s) 802.

The memory 810 may include a user interface module 814, a source code control module 816, the application 108, one or more static libraries 132, a build module 818, or other module(s) 820. The user interface module 814 is configured to provide a user interface to the one or more client devices 104. In some implementations the user interface may comprise a graphical user interface, and may be delivered as hypertext markup language ("HTML") data configured for presentation on the client devices 104.

The source code control module 816 may be configured to provide control of source code, check-in/check-out of source code to users 102, and so forth. The build module 818 is configured to take associated source code and generate a build of the application 108. The application 108 as built comprises source code configured for execution on the host device 106. In some implementations, the test executable 110 may be generated using the source code for the application 108 and one or more static libraries 132 from the test server 120. As described above, the static libraries 132 may be provided based on the selection data 126 received from the user 102.

In some implementations the functionality of the build server 118 may exist across one or more devices. For example, a first build server 118(1) may provide the user interface module 814 while a second build server 118(2) provides the source code control module 816, a third build server 118(3) provides the build module 818, and so forth.

The memory 810 may also include a datastore 822 to store information for operations of the build server 118. The datastore 822 may comprise a database, array, structured list, tree, or other data structure. In some implementations, the datastore 822 may store the test package 122 before transmission to the test server 120, the test results 142 received from the test server 120, and so forth.

The test package 122 may include information including build information 122(1), executable files 122(2), custom tests 122(3), or other data 122(P) such as testing configuration data. The build information 122(1) may provide information indicative of libraries used, host devices 106 supported, build version number information, and so forth for a particular application build. For example, the build information 122(1) may indicate that the test package 122 includes build 1229.203.23.1 which is configured for execution on a particular computing device model from manufacturer "A". The executable files 122(2) may include executable binaries, markup language applications, and so forth, which are configured for execution on the host devices 106.

The custom tests 122(3) comprise information indicative of tests, test scripts 114, designation portions of the application 108 to test, and so forth. For example, the user 102 may generate a custom test 122(3) to exercise particular functionality of the application 108. These custom tests 122(3) may comprise unit tests configured for use on the host devices 106 in the host device farm 140. For example, the custom tests 122(3) may include those developed in the OCUnit testing framework promulgated by sente.ch from Sen:te of Switzerland, Calabash as promulgated by lesspainful.com of Denmark, Frank as promulgated by testingwithfrank.com as associated with ThoughtWorks Inc. of Chicago, Ill. The test package 122 may include other data 122(P) such as user identification, account information, and so forth.

The custom tests 122(3) may be based at least in part on previously generated test scripts 114. For example, the test script 114 based on input data from earlier use may be modified by the developer user 102 and resubmitted as a custom test 122(3). Likewise, the test results 142, local results 112, and so forth may also be stored.

Other data 824 may also be stored, such as the API URL associated with the test server 120, historical test results, version information, code check-in/check-out information, build status, and so forth. To this end, the datastore 822 may be configured to store and maintain information relating to the testing of the application 108 including test success rates, as well as, failure reports augmented with context screenshots to pinpoint causes and activities at various crash times.

Figure 9:
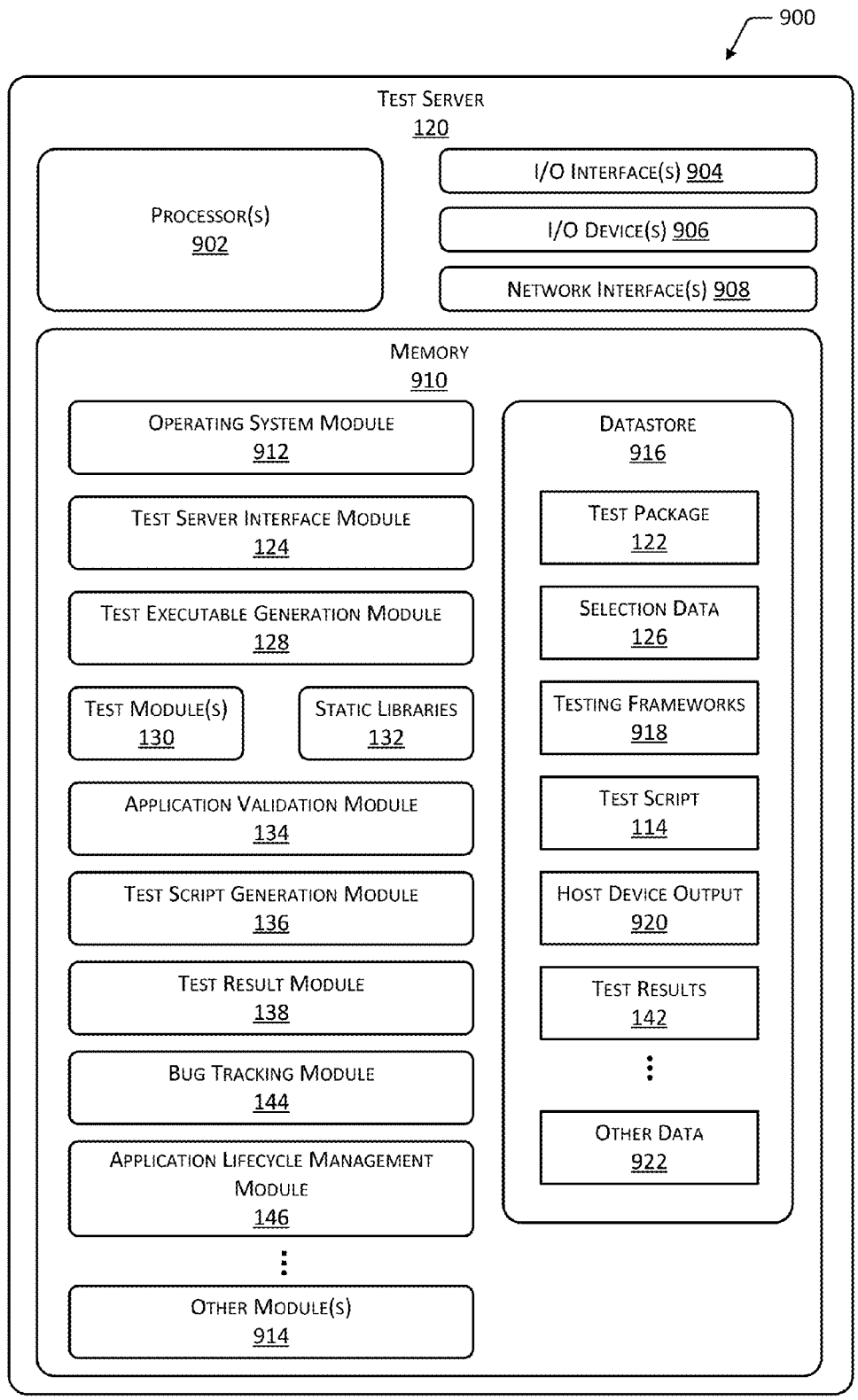
FIG. 9 depicts a block diagram of the test server configured to generate a test executable for testing the application on the host device.

FIG. 9 depicts a block diagram 900 of the test server 120 configured to generate the test executable 110 for execution on the host device 106. The test server 120 may include one or more processors 902 configured to execute one or more stored instructions. The processors 902 may comprise one or more cores. The test server 120 may include one or more I/O interface(s) 904 to allow the test server 120 to communicate with other devices. For example, the I/O interface(s) 904 may be configured to provide a universal serial bus (USB) connection to couple to the host device 106. The I/O interfaces 904 may also be known as "communication interfaces."

The I/O interface(s) 904 may couple to one or more I/O devices 906, such as described above. In some embodiments, the I/O device(s) 906 may be physically incorporated with the test server 120 or be externally placed.

The test server 120 may also include one or more network interfaces 908 to enable communications between the test server 120 and other networked devices such as those depicted in FIG. 1. Such network interface(s) 908 may include one or more NICs or other types of transceiver devices configured to send and receive communications over the network(s) 116. For example, the network interface(s) 908 may be configured to provide a Wi-Fi connection compliant with one or more IEEE 802.11 standards such as 802.11g or 802.11n. The test server 120 may also include one or more busses or other internal communications hardware or software that allow for the transfer of data between the various modules and components of the test server 120.

The test server 120 may include one or more memories 910. The memory 910 comprises one or more CRSM as described above. The memory 910 provides storage of computer readable instructions, data structures, program modules, and other data for the operation of the test server 120.

The memory 910 may include at least one OS module 912. The OS module 912 is configured to manage hardware resources such as the I/O interface(s) 904 and network interface(s) 908, and to provide various services to applications or modules executing on the processor(s) 902.

The memory 910 may store one or more of the test server interface module 124, the application validation module 134, the test script generation module 136, the test result module 138, the bug tracking module 144, the application lifecycle management module 146, and so forth.

The test server interface module 124 is configured to accept and respond to the test package 122, the input data, or other information sent by the client device 104, the host device 106, the build server 118, or both. The test server interface module 124 may be configured to provide a user interface indicative of the one or more test modules 130, such as shown above with regard to FIGS. 2-3. The test server interface module 124 may receive the user input provided through the user interface. The user input may be stored in the datastore 916, with the user input indicative of one or more test modules 130. The selection data 126 may be the user input from the datastore 916.

In another implementation the test server interface module 124 may be configured to provide an application programming interface ("API"). The API may be configured to receive data indicative of one or more test modules 130. This data may be stored in the datastore 916 and accessed as the selection data 126.

The test server interface module 124 may also be configured to send the test results 142 or other information to the client device 104, host device 106, build server 118, or a combination thereof. Use of the test server interface module 124 allows the client device 104, the host device 106, and the build server 118 to integrate the testing functionality of the test server 120 into the automated or semi-automated testing processes associated with the application build.

The generation module 128 is configured to accept the selection data 126 and access the test modules 130 indicated therein. In one implementation, the generation module 128 may be configured to generate the test executable 110 incorporating these test modules 130. For example, where root access is available on the host device 106, the test executable 110 may be provided to the host device 106 as a binary file ready for execution on the host device 106. This test executable 110 may be used to analyze other applications 108 executing on the host device 106.

When root access is unavailable on the host device 106, the generation module 128 may provide one or more static libraries 132 based on the selection data 126. These static libraries 132 are configured for compiling by the build server 118 or another device. The user 102 may then compile the code for their application 108 with the static libraries 132 to generate the test executable 110. The test executable 110 may then be executed on the host device 106.

Other modules 914 such as an unpack module and a test file validation module may also be present. The unpack module may be configured to unpack the test package 122. The unpacking may include one or more of separating out the application build, tests, configuration data, build information, and so forth.

An application validation module 134 may be configured to generate an object level hierarchy for the application, based on the assembly code generated by the assembly code generation module on the host device 106. In some cases, the test server 120 may iteratively query the assembly code on the host device 106 to determine parent/child hierarchical relationships between various objects associated with the application. The object level hierarchy may then be built based on these determined parent/child relationships. In some embodiments, the objects employed to build the object level hierarchy include those objects associated with a particular object type, aspect, or feature set of the application, and may also be known as "application objects".

The application validation module 134 may also be configured to validate and verify that the application 108 meets design and development requirements. The test file validation module may be configured to validate and verify that test package 122 is a valid file type for the particular framework that is used for testing the application 108.

The test script generation module 136 uses the input event data to generate one or more test scripts 114. This test script 114 may be deployed to the host devices 106 in the host device farm 140 for use in testing the application 108. By using the test script 114 the user inputs may be replayed to exercise the application 108 without human intervention. As described above, in some implementations the test script 114 may have been modified by the developer user 102(1) after creation. This replay may occur on the host device 106, or on one or more of the devices in the host device farm 140.

The test result module 138 is configured to generate test results 142 based at least in part on information provided by one or more of the host devices 106. This information may be gathered during execution of the application 108.

The bug tracking module 144 is configured to maintain information about bugs or issues associated with the application 108. The application lifecycle management module 146 may provide additional functions associated with governance, development, maintenance, and so forth of the application 108. In some implementations the bug tracking module 144, the application lifecycle management module 146, or both, may be executed on a different server.

Other modules 914 may also be stored in the memory 910.

The memory 910 may also include a datastore 916 to store information for operations of the test server 120. The datastore 916 may comprise a database, array, structured list, tree, program code, or other data structure.

The datastore 916 may also include the test package 122 as received from the client device 104 or the build server 118 using the test server interface module 124. The selection data 126 may also be stored.

Testing frameworks 918 may also be stored in the datastore 916. Examples of various frameworks include OCUnit, UIAutomation, KIF, Calabash, Frank, and so forth. These testing frameworks enable users to create tests that automate tasks of testing functionality of the application 108 on one or more host devices 106. The one or more test scripts 114 may also be stored in the memory 910. Host device output 920 may also be stored. The host device output 920 comprises information received from the host devices 106 in the host device farm 140. The host device output 920 is discussed in more detail below with regard to FIG. 10.

The test results 142 may also be stored in the datastore 916, along with other data 922. In some implementations the local results 112 may also be received from the host device 106 and stored. The test results 142, local results 112, or both, may include failure reports, screenshots for all of the test frameworks, logs of each of the host devices 106, user interface information, and any additional files that the test creates. Additionally, the test results 142 may include information related to anomalous occurrences during testing of the application 108 that have occurred by various causes, other than by defects or bugs in the application 108. In order to follow up the causes of the failures, detailed information on operating environments, statuses of the system in use, and so forth may also be included in the test results 142.

The other data 922 may include account information, billing preferences, test configurations, and so forth.

Figure 10:
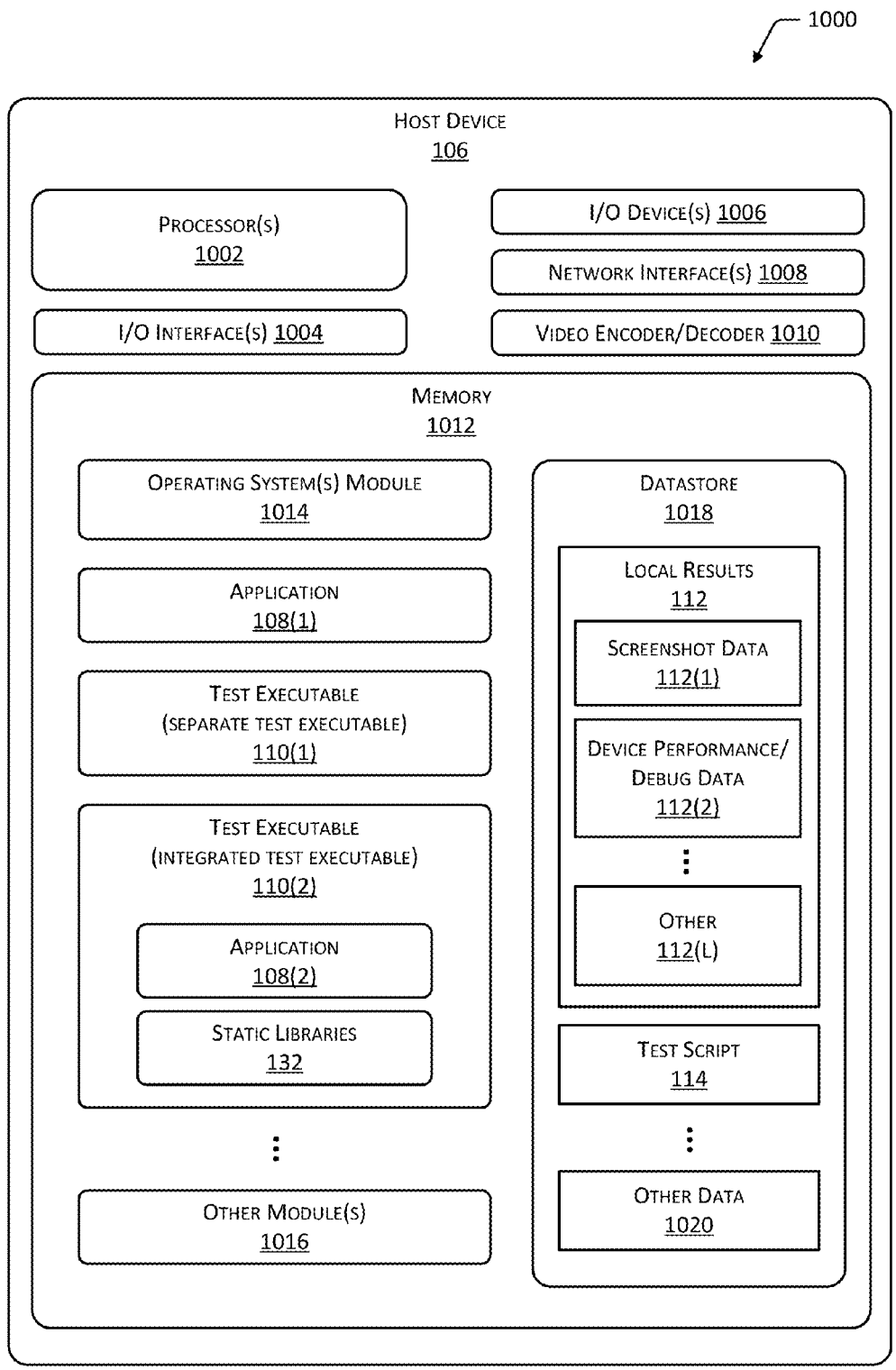
FIG. 10 depicts a block diagram of the host device which may execute the test executable to locally test the application.

FIG. 10 depicts a block diagram 1000 of the host device 106. As described above, the host device 106 may execute the test executable 110 to gather local results 112 about execution of the application 108. The host device 106 may include one or more processors 1002 configured to execute one or more stored instructions. The processors 1002 may comprise one or more cores.

Similar to the devices described above, the host device 106 may include one or more I/O interface(s) 1004 to allow the host device 106 to communicate with other devices. The I/O interface 1004 may be configured to provide a USB connection.

The I/O interface 1004 may couple to one or more I/O devices 1006. The I/O devices 1006 may include user input devices such as one or more of a keyboard, a mouse, a pen, a game controller, a voice input device, a touch input device, accelerometers, motion sensors, gestural input device, and so forth. The I/O devices 1006 may include output devices such as one or more of a display, a printer, audio speakers, haptic output device, and so forth. In some embodiments, the I/O devices 1006 may be physically incorporated with the host device 106 or be externally placed.

The host device 106 may also include one or more network interfaces 1008 configured to send and receive communications over the one or more networks 116. The host device 106 may also include one or more busses or other internal communications hardware or software that allow for the transfer of data between the various modules and components of the host device 106.

The host device 106 may include a hardware-based video encoder/decoder 1010. While a hardware-based video encoder/decoder is described, in some implementations a hardware-based video encoder may be used. The video encoder/decoder 1010 may be incorporated into a common die with the one or more processors 1002 or may be on a separate die. The video encoder/decoder 1010 may be configured to enable the capture of screenshot data in the H.264 or MPEG-4 Part 10 compliant format.

The host device 106 includes one or more memories 1012. The memory 1012 comprises one or more CRSM, as described above. The memory 1012 may include at least one OS module 1014. The OS module 1014 is configured to manage hardware resources such as the I/O interfaces 1004 and provide various services to applications or modules executing on the one or more processors 1002. The OS module 1014 may comprise mobile operating systems configured for execution on mobile computing devices. The operating systems module 1014 may implement one or more of iOS® from Apple Corp. of Cupertino, Calif.; Windows Mobile® from Microsoft Corp. of Redmond, Wash.; Android® from Google, Corp. of Mountain View, Calif. and its derivatives from various sources; Palm OS® from Palm Computing, Inc. of Sunnyvale, Calif. and its derivatives from various sources, BlackBerry OS® from Research In Motion Ltd. of Waterloo, Ontario, Canada; or other operating systems such as VxWorks from Wind River Systems of Alameda, Calif.

The memory 1012 may also include one or more of the application 108, the test executable 110, and other modules 1016. The application 108 is configured to execute on the host device 106. For example, this may be the application 108 received from the client device 104 or the build server 118.

As described above, the generation module 128 may be configured to provide the test executable 110, or one or more static libraries 132 which may be included when compiling test executable 110. The test executable 110 may thus be separate from the application 108 under test, or integrated with the application under test.

The test executable 110(1) is depicted here as separate from the application 108(1) and may be known as a "separate test executable". When root access is available in the OS of the host device 106, the test executable 110(1) is able to acquire information about the application 108(1) during execution. However, when root access is unavailable, the functionality of the test executable 110(1) with respect to the application 108(1) is curtailed due to the OS. In comparison, the test executable 110(2) incorporates the static libraries 132 which are as well as the application 108(2). The test executable 110(2) may be known as an "integrated test executable". As a result, even when the test executable 110(2) is sandboxed, the functionality provided by the static libraries 132 are operational within the same sandbox as the application 108(2), and thus at least some functionality is available.

The other modules 1016 may also be included in the host device 106. These other modules 1016 may include, but are not limited to, other applications not under test.

The memory 1012 also includes a datastore 1018 to store information for operations of host device 106. The datastore 1018 may comprise a database, array, structured list, tree, or other data structure. The datastore 1018 may store the local results 112. These local results 112 may include host device output such as screenshot data 112(1) generated by the test executable 110. The local results 112 may also include device performance and/or debug data 112(2) and other information gathered by the test executable 110. Other local results 112(L) may also be stored. The local results 112 may be presented to the user 102 by the host device 106, provided to the client device 104, the build server 118, the test server 120, or a combination thereof.

In some implementations at least a portion of the input event data may be stored in the memory 1012. One or more of the test scripts 114 may also be stored in the memory 1012. Other data 1020 may also be stored in the datastore 1018.

Figure 11:
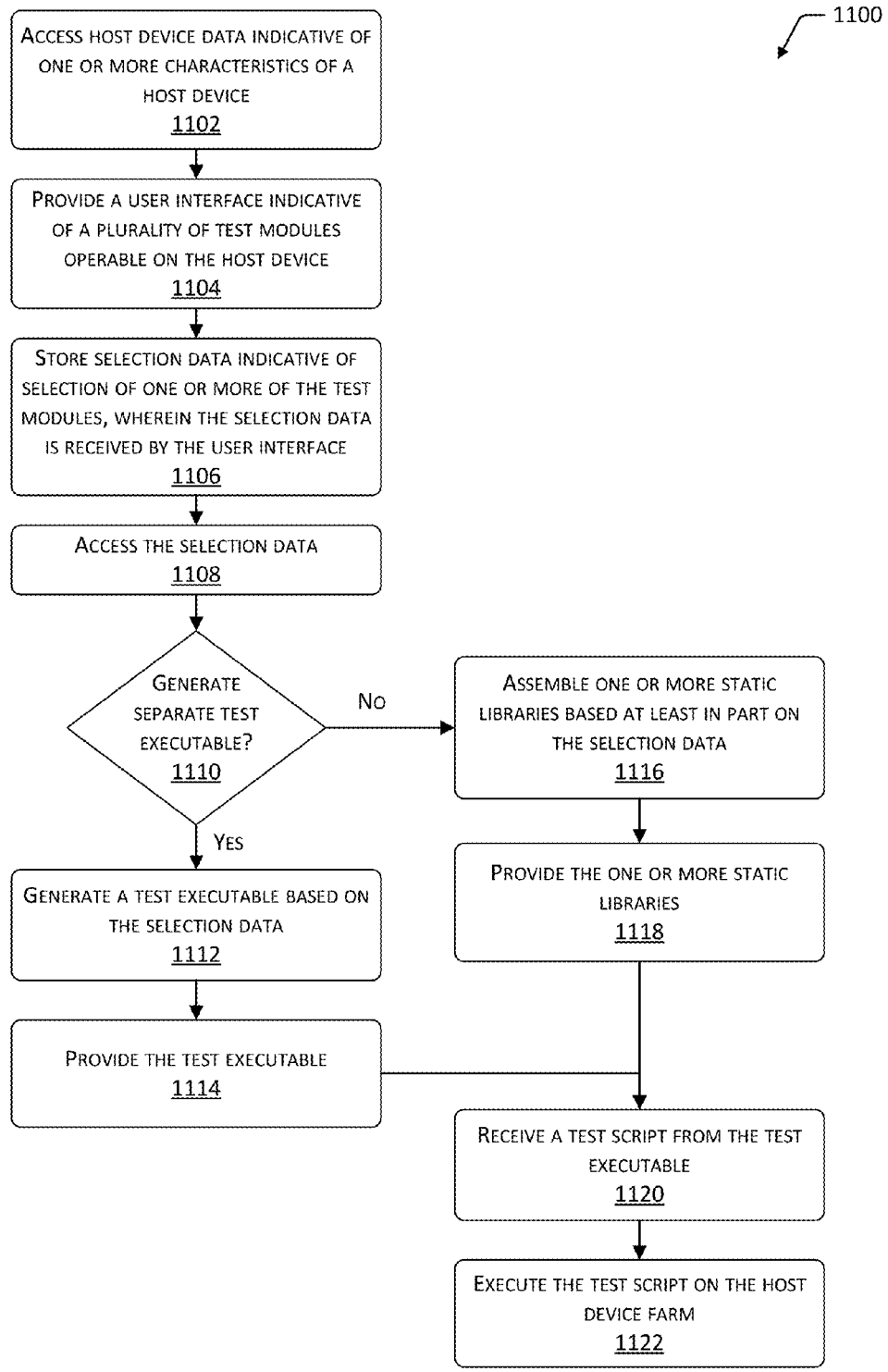
FIG. 11 depicts a flow diagram of a process to generate the test executable.

FIG. 11 depicts a flow diagram of a process 1100 to generate the test executable 110 based at least in part on the selection data 126. The process 1100 may be implemented by one or more of the host device 106, the client device 104, the build server 118, or the test server 120.

Block 1102 accesses host device data indicative of one or more or more characteristics of the host device 106. The characteristics of the host device 106 comprising one or more of: an operating system version, a processor type, an available memory, an input device, UUID, processor identifier, device identifier, and so forth. For example, the user interface 200 may provide inputs for the user 102 to specify whether root access is available on the host device 106.

Block 1104 provides a user interface indicative of a plurality of test modules 130 operable on the host device 106. In some implementations, the user interface may present those test modules 130 which are operable on the host device 106, based on accessing the one or more characteristics. For example, based on the operating system, processor, and so forth of the host device 106 particular test modules 130 may be available. The user interface may also accept a user preference as to whether to generate a separate test executable or provide the static libraries 132 for creation of an integrated test executable.

Block 1106 stores selection data 126 indicative of one or more of the test modules. As described above, the selection data 126 may be received by the user interface. For example, the test server 120 may store user inputs to the user interface 200. In other implementations the selection data 126 may be received from another device, such as from the build server 118 using an API.

Block 1108 accesses the selection data 126. For example, the selection data 126 may be retrieved from the memory of the test server 120.

Block 1110 determines whether the integrated test executable or the separate test executable has been selected. In one implementation, the separate test executable may be selected when root access to the host device 106 is determined to be available. This determination may be based on an automated process inspecting the host device 106, user input such as in the user interface 200 with the control 202, and so forth. The root access is configured to allow access and changes to an operating system executing on the host device 106, the root access comprising one or more of at least one administrative permission or at least one administrative right. When block 1110 determines the preference for the separate test module, the process proceeds to block 1112.

Based at least in part on the selection data 126, block 1112 generates a test executable 110 that includes the selected test modules 130. The test modules 130 may be configured to provide functions including, but not limited to runtime debugging of the application 108, performance assessment of the application 108, generating a test script associated with execution of the application 108, running the test script to exercise the application 108, application bug tracking, or recording the application 108 during execution. As described above, the test modules 130 may include one or more of a native application debugger module, a hypertext markup language application debugger module, a network capture module, a function tracing module, a metric module, a statistic module, a test case creation module, a display capture module, a hypertext transport protocol server module, a remote control module, and so forth. The test executable 110 may be configured with one or more digital rights techniques to limit operability to a particular user account, host device 106, and so forth. For example, during generation the test executable 110 may be configured such that the particular UUID of the host device 106 is required for execution. As a result, the test executable 110 may execute on one host device 106(1) having the UUID associated during generation by the test executable generation module 128, but not on another 106(2) with a different UUID.

The display capture module may be configured to record the application 108 during execution. The recording may include one or more of storing screenshots of images presented for display by the host device 106, storing user input to the host device 106, storing audio for presentation by one or more speakers of the host device 106, storing audio detected by a microphone, storing output of the host device 106, or storing input gathered by one or more sensors of the host device 106.

Block 1114 provides the test executable 110 to the host device 106. As described above, this is a separate test executable 110, in that it is an application 108 which is separate from the application 108 under test. For example, the test server 120 may send the test executable 110 to the host device 106 using the network 116. In another implementation, the test executable 110 may be provided to another device, which in turn provides the test executable 110 to the host device 106.

In some implementation the test executable 110 may have one or more references to one or more dynamic libraries configured to be linked to the test executable 110 at load time or run time. The test server 120 or another device may provide the one or more dynamic libraries to the host device 110.

Returning to block 1110, when the selection is to generate an integrated test executable the process proceeds to block 1116. For example, root access may be unavailable on the host device 106, resulting in a selection of the integrated test executable. Block 1116 assembles one or more static libraries 132 based at least in part on the selection data 126. The assembly may include retrieval of the static libraries 132 from storage, generation of the static libraries 132, incorporation of digital rights techniques, and so forth. For example, the static libraries 132 may be configured to be executable only on the particular host device 106.

Block 1118 provides the one or more static libraries 132. The one or more static libraries 132 may be sent to the client device 104, the host device 106, the build server 118, or another device. For example, the static libraries 132 may be sent using the network 116 to a receiving device. As described above, the receiving device may use the static libraries 132 in conjunction with the source code of the application 108 to generate the test executable 110.

As described above, the test executable 110 may be configured to provide a user interface to access one or more functions provided by the selected test modules 130. For example, the test executable 110 may include instructions configured to present the user interface 500. Instructions may be provided which are configured to be compiled into source code of the application 108, wherein the instructions are configured to initiate presentation of a user interface associated with the selected test modules 130.

The determination of block 1110 as to whether the process proceeds to block 1112 or 1116 may be made based on availability of the root access on the host device 106, or regardless of the availability of root access. For example, the user 102 may choose to integrate the test modules 130 with the application 108 using the static libraries 132 to generate the test executable 110 for execution on the host device 106 which has root access available.

After block 1114 or block 1118, the process may proceed to block 1120. Block 1120 receives the test script 114 from the test executable 110 executing on the host device 106. The test script 114 may be based on input event data and comprise one or more instructions configured to, when executed, operate one or more application objects in the application 108.

Block 1122 executes a plurality of instances of the application 108 on a plurality of host devices in a host device farm 140, testing at least a portion of the plurality of instances of the application 108 in the host device farm 140, using the test script 114.

Figure 12:
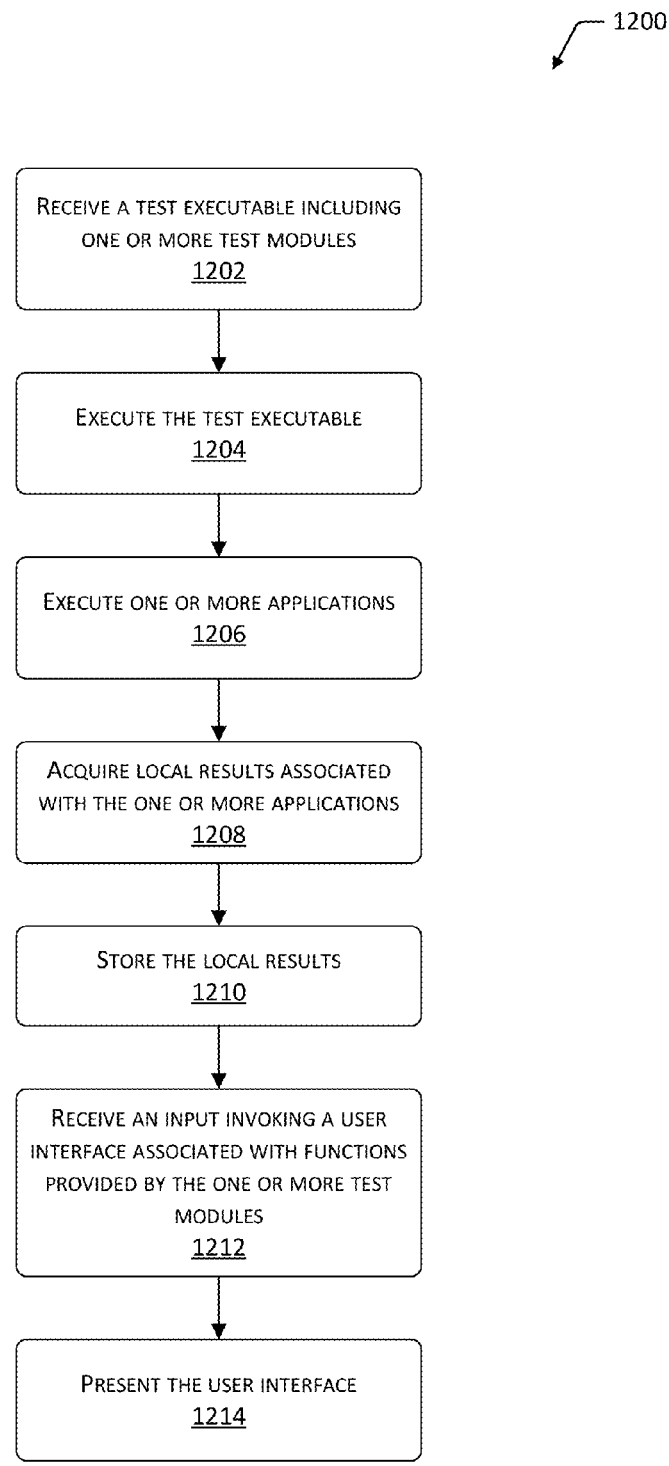
FIG. 12 depicts a flow diagram of a process to use a stand-alone test executable for testing applications executing on the host device.

FIG. 12 depicts a flow diagram of a process 1200 to use a stand-alone test executable 110 for testing applications 108 executing on the host device 106. The host device 106 may implement at least a portion of the process 1200. The process 1200 may be used when root access to the operating system executing on the host device 106 is available.

Block 1202 receives the test executable 110. The test executable 110 comprises a subset of test modules 130. In some implementations, the subset may include a display capture module configured to record a plurality of screenshots associated with the application 108 during execution.

The subset of test modules 130 may also include the test script generation module 136 configured to generate one or more test scripts 114 on the host device 106. Using the test script generation module 136, the host device 106 may generate one or more test scripts 114 based at least in part on the execution of the application 108.

As described above, the subset may be based on the selection data 126. The selection data 126 may be based on user input, such as to the user interface 200, to select one or more test modules 130 from a plurality of test modules 130.

Block 1204 executes the test executable 110 on the host device 106. For example, the user 102 may launch the test executable 110. The test executable 110 may be executed with root access to the operating system. Block 1206 executes one or more applications 108 on the host device 106.

Block 1208 acquires local results 112 associated with the one or more applications 108 executing on the host device 106. As described above, the local results 112 may include the plurality of screenshots associated with the application during execution of the one or more applications 108. Data associated with the execution of the one or more applications 108 may thus be included in the local results 112. For example, the local results 112 may include data from a first application 108(1) and a second application 108(2) which are indicative of the execution of the respective applications 108. A comparison may then be generated between at least a portion of the data from each of the applications 108. This comparison may be used to assessment, benchmarking, evaluation, and so forth. For example, performance of the application 108(1) may be tested against a prior version of the application 108(2).

Block 1210 stores the local results 112 in the memory 1012. As described above, the local results 112 may be provided to the client device 104, the build server 118, the test server 120, or another device.

Block 1212 receives an input invoking a user interface associated with functions provided by the one or more test modules 130. For example, a particular touch gesture or keyboard input may be configured to present the user interface 500 on the display of the host device 106. Block 1214 presents the user interface. With the user interface, the user 102 is able to interact with the testing and associated functionality provided by the test modules 130.

In some implementations, additional blocks may send the one or more test scripts 114 generated by the test script generation module 136 to the test server 120. The test server 120 may then send the test script 114 to the plurality of host devices in the host device farm 140 for testing.

Figure 13:
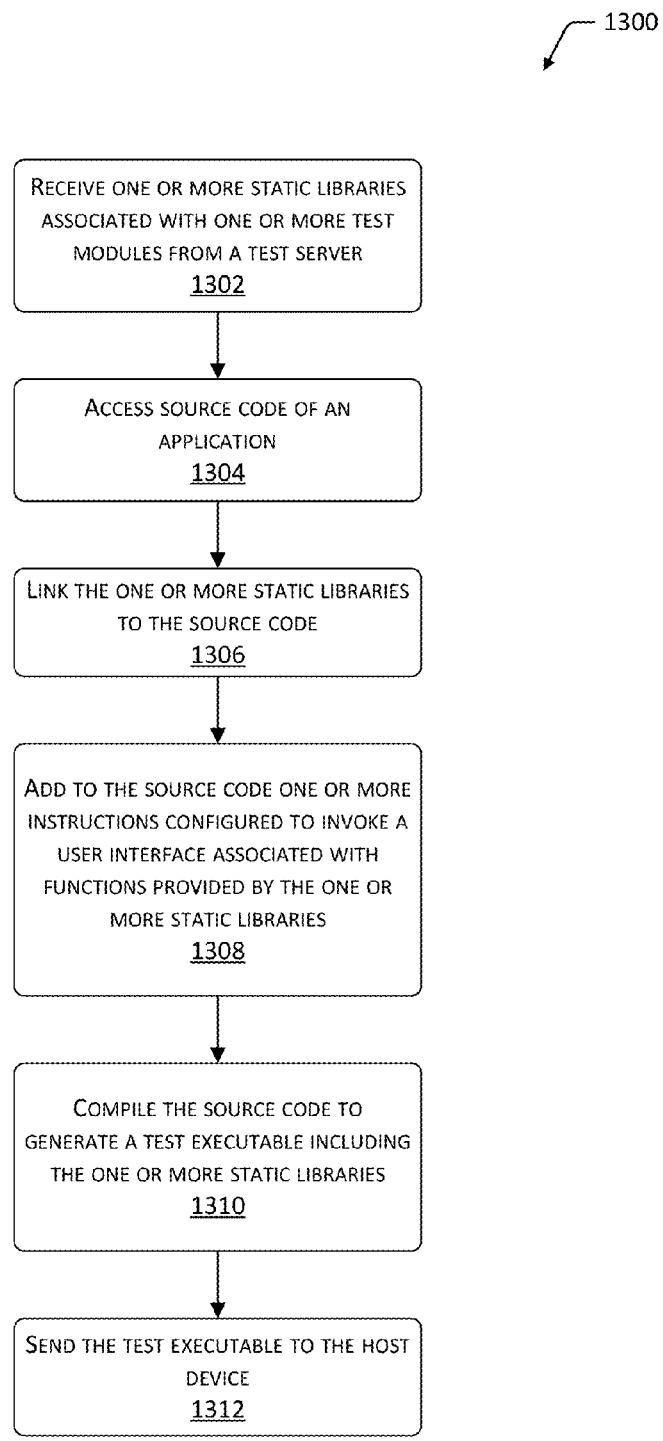
FIG. 13 depicts a flow diagram of a process to generate a test executable incorporating one or more test modules and the application under test.

FIG. 13 depicts a flow diagram of a process 1300 to generate the test executable 110 incorporating one or more test modules 130 and the application 108 under test. The build server 118 may implement at least a portion of the process 1300.

Block 1302 receives one or more static libraries 132. The one or more static libraries 132 are associated with one or more test modules 130. The static libraries 132 may be received from the test server 120.

Block 1304 accesses source code of the application 108 undergoing test. For example, the source code may be stored on the build server 118.

Block 1306 links the one or more static libraries 132 to the source code of the application 108. Block 1308 modifies the source code to include one or more instructions configured to invoke a user interface associated with the functions provided by the one or more static libraries 132. For example, a particular touch sensor gesture may be configured to open the user interface 500.

Block 1310 compiles the source code to generate the test executable 110 which includes the one or more static libraries 132. The test executable 110 now includes the original functions of the application 108 as designed by the developer, as well as the test functions provided for in the test modules 130 indicated by the selection data 126.

Block 1312 sends the test executable 110 to the host device 106. For example, the build server 118 may use the network 116 to send the test executable 110 to the client device 104. The client device 104 may then be connected via a tether to the host device 106, and install the test executable 110. The test executable 110 may be configured to provide local results 112 when root access to the host device 106 is unavailable.

Figure 14:
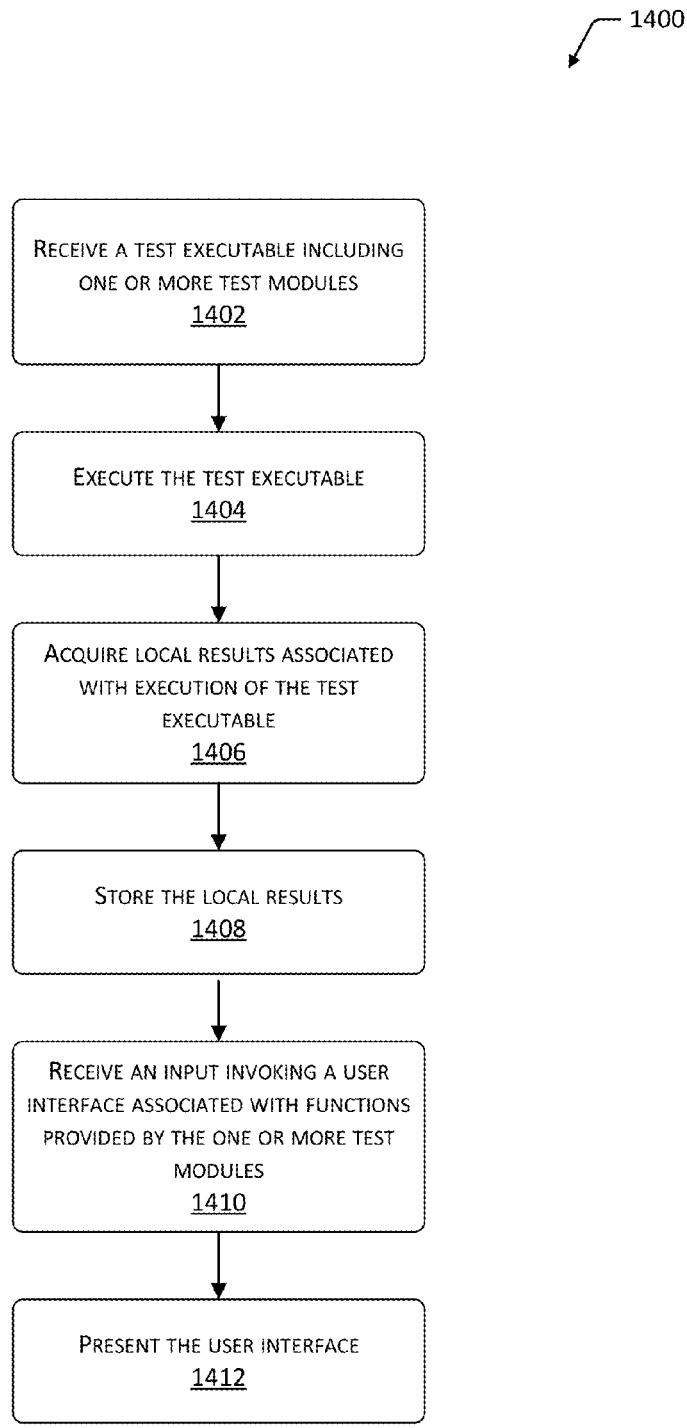
FIG. 14 depicts a flow diagram of a process to generate local results with the test executable incorporating the one or more test modules and the application under test.

FIG. 14 depicts a flow diagram of a process 1400 to generate local results 112 with the test executable 110 incorporating the one or more test modules 130 and the application 108 under test. The host device 106 may implement at least a portion of the process 1400. The process 1400 may be used when root access is unavailable to the test executable 110 as executing on the host device 106.

Block 1402 receives the test executable 110 including one or more test modules 130. For example, the build server 118 using the static libraries 132, as described above with regard to FIG. 13, may have generated the test executable 110.

Block 1404 executes the test executable 110. Block 1406 acquires the local results 112 of the test executable 110. As described above, where the test executable 110 is sandboxed, the information may be limited to that which is accessible from within the sandbox.

Block 1408 stores the local results 112. For example, the local results 112 may be stored in the memory 1012. As described above, the local results 112 may be provided to the client device 104, the build server 118, the test server 120, or another device.

Block 1410 receives an input invoking a user interface associated with functions provided by the one or more test modules 130. For example, a particular touch gesture or keyboard input may be configured to present the user interface 500 on the display of the host device 106. Block 1412 presents the user interface. With the user interface, the user 102 is able to interact with the testing and associated functionality provided by the test modules 130.

In some implementations, additional blocks may send the one or more test scripts 114 generated by the test script generation module 136 to the test server 120. The test server 120 may then send the test script 114 to the plurality of host devices 106 in the host device farm 140 for testing.

As development continues, the test modules 130 are updated, needs of the user 102 change, and so forth, the system 100 may be used to easily provide test executables 110 tailored for the evolving situation. The test executable 110 allows the user 102 to implement comprehensive testing on the host device itself 106, while retaining the ability to leverage resources such as the host device farm 140 for additional testing. The user 102 is thus able to take advantage of the ability to implement standalone testing as well as integrating with external resources.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in a computer-readable storage medium as instructions executable on one or more processors.

Separate instances of these programs can be executed on, or distributed across, separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
   at least one processor;
   and
   at least one memory coupled to the at least one processor and storing instructions configured for execution on the at least one processor, the instructions further configured to:
   receive host device data indicative of one or more characteristics of a host device;
   based on the one or more characteristics, provide a user interface indicative of a plurality of test modules operable on the host device;
   receive selection data indicative of one or more of the plurality of test modules;
   receive availability data indicative of availability of root access on the host device;
   based at least in part on the selection data, generate a test executable that includes the selected test modules;
   provide the test executable to the host device; and
   provide one or more static libraries to a client indicated by the selection data and based on the availability data indicating unavailability of root access on the host device.

2. The system of claim 1, the characteristics of the host device comprising one or more of:
   an operating system version, a processor type, an available memory, or an input device.

3. The system of claim 1, the test modules comprising one or more of:
   a native application debugger module,
   a hypertext markup language application debugger module,
   a network capture module,
   a function tracing module,
   a metric module,
   a statistic module,
   a test case creation module,
   a display capture module,
   a remote debugger module,
   a hypertext transport protocol server module, or
   a remote control module.

4. The system of claim 1, wherein the root access is configured to allow access and to change an operating system executing on the host device, the root access comprising one or more of at least one administrative permission or at least one administrative right.

5. A method, comprising:
   accessing selection data indicative of selection of one or more test modules configurable for execution on a host device;
   determining whether the selection data indicates a preference for a separate test executable;
   after determining that the selection data indicates the preference for the separate test executable, generating a test executable that includes the selected one or more test modules;
   providing the test executable;
   determining whether the selection data indicates a preference for an integrated test executable and whether availability data indicates unavailability of root access on the host device; and
   after determining that the selection data indicates the preference for the integrated test executable and that the availability data indicates unavailability of root access on the host device, providing one or more libraries associated with the selected one or more test modules.

6. The method of claim 5, wherein the one or more test modules are configured to provide one or more functions including:
   runtime debugging of the application,
   performance assessment of the application,
   generating a test script associated with execution of the application,
   running the test script to exercise the application,
   remote debugging from a client device,
   application bug tracking, or
   recording the application during execution.

7. The method of claim 6, wherein the recording the application during execution comprises one or more of:
   storing screenshots of images presented for display by the host device,
   storing user input to the host device,
   storing audio for presentation by one or more speakers of the host device,
   storing audio detected by a microphone,
   storing output of the host device, or
   storing input gathered by one or more sensors of the host device.

8. The method of claim 5, wherein the test executable comprises one or more references to one or more dynamic libraries configured to be linked to the test executable at load time or run time.

9. The method of claim 5, wherein the test executable is configured to provide a user interface to access one or more functions provided by the selected one or more test modules.

10. The method of claim 5, further comprising:
    receiving from the host device a test script based on input event data, wherein the test script comprises one or more instructions configured to, when executed, operate one or more application objects in the application;
    executing a plurality of instances of the application on a plurality of host devices; and
    testing at least a portion of the plurality of instances of the application using the test script.

11. The method of claim 5, further comprising:
after determining that the selection data indicates the preference for the separate test executable, providing instructions configured to be compiled into source code of the application, wherein the instructions are configured to initiate presentation of a user interface associated with the selected test modules.

12. The method of claim 5, further comprising:
providing a user interface;
receiving user input indicative of the one or more test modules through the user interface;
storing the user input indicative of the one or more test modules; and
wherein the accessing the selection data comprises retrieving the stored user input.

13. The method of claim 5, further comprising:
providing an application programming interface configured to receive data indicative of one or more test modules;
receiving, using the application programming interface, the data indicative of one or more test modules;
storing the data indicative of selection of the one or more test modules; and
wherein accessing data indicative of selection comprises retrieving the stored data indicative of the selection of the one or more test modules.

14. The method of claim 5, further comprising:
providing a user interface comprising an input field configured to accept data indicative of the availability of root access on the host device;
receiving, using the user interface, user input indicative of the availability of the root access on the host device;
storing the user input; and
wherein the accessing the data indicative of the availability of root access comprises retrieving the data indicative of the availability root access.

15. The method of claim 5, the providing one or more libraries comprising sending the one or more libraries to a client device, wherein the client device is configured to include references to the one or more libraries in the source code of the application.

16. A non-transitory computer readable medium storing instructions which, when executed by a processor, cause the processor to perform actions comprising:
executing an availability application that utilizes an operating system, wherein the availability application is configured to determine availability data indicative of availability of root access to the operating system;
providing the availability data;
receiving a test executable comprising a subset of test modules, the subset including a module configured to record a plurality of screenshots associated with an application during execution of the application, wherein the test executable is generated based upon the availability data;
executing the test executable with root access to the operating system;
executing the application; and
storing the plurality of screenshots associated with the application during execution.

17. The non-transitory computer readable medium of claim 16, wherein the actions further comprise:
storing first data from the test executable, wherein the first data is indicative of the execution of the application;
executing a second application;
storing second data from the test executable, wherein the second data is indicative of the execution of the second application; and
generating a comparison between at least a portion of the first data and the second data.

18. The non-transitory computer readable medium of claim 16, wherein the subset of test modules further includes a test script generation module configured to generate one or more test scripts; and wherein the actions further comprise:
generating the one or more test scripts based at least in part on the execution of the application.

19. The non-transitory computer readable medium of claim 18, the actions further comprising sending the one or more test scripts for execution on a plurality of host devices.

20. The non-transitory computer readable medium of claim 18, wherein the subset of test modules is based at least in part on user input selecting one or more test modules from a plurality of test modules.

* * * * *